(12) United States Patent
Waters

(10) Patent No.: US 8,491,118 B2
(45) Date of Patent: Jul. 23, 2013

(54) LIGHTED READING GLASSES

(76) Inventor: Michael Waters, Aspen, CO (US)

(*) Notice: Subject to any disclaimer, the term of this patent is extended or adjusted under 35 U.S.C. 154(b) by 212 days.

(21) Appl. No.: 13/102,821

(22) Filed: May 6, 2011

(65) Prior Publication Data

US 2011/0228211 A1 Sep. 22, 2011

Related U.S. Application Data

(63) Continuation-in-part of application No. 12/687,822, filed on Jan. 14, 2010, now Pat. No. 8,152,330, which is a continuation of application No. 11/557,748, filed on Nov. 8, 2006, now Pat. No. 7,661,818, which is a continuation-in-part of application No. 10/571,796, filed as application No. PCT/US02/35665 on Nov. 7, 2002, now Pat. No. 7,562,979, which is a continuation-in-part of application No. 10/145,595, filed on May 14, 2002, now Pat. No. 6,612,696, which is a continuation-in-part of application No. 10/006,919, filed on Nov. 7, 2001, now Pat. No. 6,612,695, and a continuation-in-part of application No. 12/895,456, filed on Sep. 30, 2010, and a continuation-in-part of application No. 11/941,558, filed on Nov. 16, 2007, now Pat. No. 8,388,164, which is a continuation-in-part of application No. PCT/US2006/018968, filed on May 17, 2006.

(60) Provisional application No. 61/247,243, filed on Sep. 30, 2009, provisional application No. 60/681,852, filed on May 17, 2005, provisional application No. 60/746,217, filed on May 2, 2006.

(51) Int. Cl.
*G02C 1/00* (2006.01)

(52) U.S. Cl.
USPC .......................................... 351/158; 362/105

(58) Field of Classification Search
USPC .................... 351/158, 41, 121, 111; 362/103, 362/105; D16/309
See application file for complete search history.

(56) References Cited

U.S. PATENT DOCUMENTS 1,261,824 A 1/1918 La Vine
1,255,265 A 2/1918 Zachara
(Continued)

FOREIGN PATENT DOCUMENTS

CA 2 466 175 A1 5/2003
CA 2608746 A1 11/2006
(Continued)

OTHER PUBLICATIONS

"Complaint", *Waters Industries, Inc. v. JJI International, Inc.*, United States District Court of the Northern District of Illinois, Case No. 1:12-cv-06195, 4 pages (Aug. 7, 2012).
(Continued)

*Primary Examiner* — Hung Dang
(74) *Attorney, Agent, or Firm* — Fitch, Even, Tabin & Flannery, LLP

(57) ABSTRACT

Lighted eyewear is described that projects light forwardly thereof. The eyewear includes a cross frame portion with temple arm portions extending rearwardly therefrom. Light mounts at forward portions of the temple arm portions include a forward opening and an interior space. Light emitting diodes are received in the interior space of the temple arm light mounts are mounted to project light through the forward openings thereof to a position forwardly of the cross-frame portion. A mounting surface of each light mount orients the light emitting diodes at a predetermined inwardly canted angle relative to normal from the lateral axis of the cross frame portion with the temple arm portions extending rearwardly from the cross frame portion.

31 Claims, 17 Drawing Sheets

U.S. PATENT DOCUMENTS

| | | | |
|---|---|---|---|
| 1,438,586 A | 12/1922 | Eaton |
| 1,448,353 A | 3/1923 | Barany |
| 1,572,210 A | 2/1926 | Kolibas |
| 1,615,067 A | 1/1927 | Boerman |
| 1,663,402 A | 3/1928 | Engel |
| 1,879,512 A | 9/1932 | Rotea |
| 2,196,543 A | 4/1940 | Anderson |
| 2,461,254 A | 2/1949 | Bassett |
| 2,531,585 A | 11/1950 | Pope |
| 2,567,046 A | 9/1951 | Anderson |
| 2,591,112 A | 4/1952 | Zwierzynski |
| 2,638,532 A | 5/1953 | Brady |
| 2,904,670 A | 9/1959 | Calmes |
| 2,966,580 A | 12/1960 | Taylor |
| 3,060,308 A | 10/1962 | Fortuna |
| D207,919 S | 6/1967 | Fai |
| 3,350,552 A | 10/1967 | Lawrence |
| D215,751 S | 10/1969 | Castellano |
| 3,602,759 A | 8/1971 | Evans |
| 3,634,676 A | 1/1972 | Castellano |
| 3,647,059 A | 3/1972 | Humphreys |
| 3,683,168 A | 8/1972 | Tatje |
| 3,769,663 A | 11/1973 | Perl |
| D229,975 S | 1/1974 | Klugmann |
| 3,793,517 A | 2/1974 | Carlini |
| 4,210,952 A | 7/1980 | Ressmeyer |
| 4,254,451 A | 3/1981 | Cochran, Jr. |
| 4,283,127 A | 8/1981 | Rosenwinkel et al. |
| 4,332,007 A | 5/1982 | Gibstein et al. |
| 4,406,040 A | 9/1983 | Cannone |
| 4,462,064 A | 7/1984 | Schweitzer |
| 4,516,157 A | 5/1985 | Campbell |
| 4,541,698 A | 9/1985 | Lerner |
| 4,570,206 A | 2/1986 | Deutsch |
| 4,616,297 A | 10/1986 | Liu |
| 4,631,644 A | 12/1986 | Dannhauer |
| 4,774,643 A | 9/1988 | McGinnis et al. |
| 4,822,160 A | 4/1989 | Tsai |
| 4,822,161 A | 4/1989 | Jimmy |
| 4,902,119 A | 2/1990 | Porsche |
| 4,904,078 A | 2/1990 | Gorike |
| 4,959,760 A | 9/1990 | Wu |
| 4,963,045 A | 10/1990 | Willcox |
| 5,070,436 A | 12/1991 | Alexander et al. |
| 5,113,325 A | 5/1992 | Eisenbraun |
| 5,122,943 A | 6/1992 | Pugh |
| 5,140,220 A | 8/1992 | Hasegawa |
| 5,143,443 A | 9/1992 | Madsen |
| 5,158,356 A | 10/1992 | Guthrie |
| 5,164,749 A | 11/1992 | Shelton |
| 5,183,326 A | 2/1993 | Case |
| 5,189,512 A | 2/1993 | Cameron et al. |
| 5,218,385 A | 6/1993 | Lii |
| 5,230,558 A | 7/1993 | Jong |
| 5,245,516 A | 9/1993 | de Haas et al. |
| D343,470 S | 1/1994 | Yuen |
| 5,278,734 A | 1/1994 | Ferber |
| D349,123 S | 7/1994 | Cooley et al. |
| 5,331,333 A | 7/1994 | Tagawa et al. |
| 5,331,357 A | 7/1994 | Cooley et al. |
| 5,367,345 A | 11/1994 | da Silva |
| 5,438,698 A | 8/1995 | Burton et al. |
| 5,452,190 A | 9/1995 | Priesemuth |
| 5,460,346 A | 10/1995 | Hirsch |
| 5,485,358 A | 1/1996 | Chien |
| 5,541,767 A | 7/1996 | Murphy et al. |
| 5,541,816 A | 7/1996 | Miserendino |
| 5,546,099 A | 8/1996 | Quint et al. |
| D375,372 S | 11/1996 | Allen |
| 5,575,554 A | 11/1996 | Guritz |
| 5,606,743 A | 2/1997 | Vogt et al. |
| 5,608,808 A | 3/1997 | da Silva |
| 5,610,678 A | 3/1997 | Tsuboi et al. |
| D383,754 S | 9/1997 | Yuen |
| D383,863 S | 9/1997 | Yuen |
| 5,667,291 A | 9/1997 | Caplan et al. |
| 5,667,292 A | 9/1997 | Sabalvaro |
| D388,113 S | 12/1997 | Feinbloom |
| 5,708,449 A | 1/1998 | Heacock |
| 5,722,762 A | 3/1998 | Soll |
| 5,741,060 A | 4/1998 | Johnson |
| 5,786,665 A | 7/1998 | Ohtsuki et al. |
| 5,806,961 A | 9/1998 | Dalton et al. |
| 5,836,673 A | 11/1998 | Lo |
| D405,901 S | 2/1999 | Feinbloom et al. |
| 5,871,271 A | 2/1999 | Chien |
| 5,893,631 A | 4/1999 | Padden |
| 5,918,966 A | 7/1999 | Arnold |
| 5,946,071 A | 8/1999 | Feldman |
| 5,997,165 A | 12/1999 | Lehrer |
| 6,005,536 A | 12/1999 | Beadles et al. |
| 6,012,822 A | 1/2000 | Robinson |
| 6,012,827 A | 1/2000 | Caplan et al. |
| D420,035 S | 2/2000 | Hartman |
| 6,056,413 A | 5/2000 | Urso |
| D428,431 S | 7/2000 | Jordan |
| 6,086,214 A | 7/2000 | Ridge |
| 6,172,657 B1 | 1/2001 | Kamakura et al. |
| 6,174,075 B1 | 1/2001 | Fuwausa |
| 6,206,543 B1 | 3/2001 | Henry |
| D445,928 S | 7/2001 | Sharrah et al. |
| D446,324 S | 8/2001 | Lynch et al. |
| 6,290,368 B1 | 9/2001 | Lehrer |
| 6,299,323 B1 | 10/2001 | Yu et al. |
| 6,302,570 B1 | 10/2001 | Petell et al. |
| 6,311,837 B1 | 11/2001 | Blaustein et al. |
| 6,320,822 B1 | 11/2001 | Okeya et al. |
| 6,367,949 B1 | 4/2002 | Pederson |
| D457,670 S | 5/2002 | Allen |
| 6,386,701 B1 | 5/2002 | Khulusi |
| 6,390,640 B1 | 5/2002 | Wong |
| 6,439,738 B1 | 8/2002 | Matthews et al. |
| 6,457,838 B1 | 10/2002 | Dugmore et al. |
| 6,461,025 B1 | 10/2002 | Payne |
| 6,474,830 B1 | 11/2002 | Hansen |
| D469,198 S | 1/2003 | Olson |
| 6,504,099 B2 | 1/2003 | Huang |
| 6,523,973 B2 | 2/2003 | Galli |
| 6,530,672 B2 | 3/2003 | Galli |
| D473,890 S | 4/2003 | Waters |
| 6,549,231 B1 | 4/2003 | Matsui |
| 6,554,444 B2 | 4/2003 | Shimada et al. |
| D477,432 S | 7/2003 | Parsons |
| 6,604,837 B2 | 8/2003 | Sandberg |
| 6,612,695 B2 | 9/2003 | Waters |
| 6,612,696 B2 | 9/2003 | Waters |
| D484,905 S | 1/2004 | Waters |
| 6,713,956 B2 | 3/2004 | Hsing Chen et al. |
| 6,749,166 B2 | 6/2004 | Valentine et al. |
| 6,764,194 B1 | 7/2004 | Cooper |
| 6,802,636 B1 | 10/2004 | Bailey, Jr. |
| 6,808,284 B1 | 10/2004 | Chao |
| 6,824,265 B1 | 11/2004 | Harper |
| 6,830,357 B2 | 12/2004 | Lopez |
| D501,266 S | 1/2005 | Harris et al. |
| 6,857,739 B1 | 2/2005 | Watson |
| 6,860,628 B2 | 3/2005 | Robertson |
| 6,863,416 B2 | 3/2005 | Waters |
| D507,368 S | 7/2005 | Waters |
| D507,369 S | 7/2005 | Waters |
| 6,929,878 B2 | 8/2005 | Chen et al. |
| 6,966,668 B2 | 11/2005 | Cugini et al. |
| 6,977,776 B2 | 12/2005 | Volkenandt et al. |
| 6,993,803 B2 | 2/2006 | Chan |
| 6,997,552 B1 | 2/2006 | Hung |
| 7,003,353 B1 | 2/2006 | Parkhouse |
| 7,004,582 B2 | 2/2006 | Jannard et al. |
| 7,008,074 B1 | 3/2006 | Halm |
| 7,021,790 B2 | 4/2006 | Parsons |
| 7,094,981 B2 | 8/2006 | Sorrentino et al. |
| 7,104,670 B2 | 9/2006 | Waters |
| 7,105,939 B2 | 9/2006 | Bednyak |
| 7,111,956 B2 | 9/2006 | Brown |
| 7,118,241 B2 | 10/2006 | Sohn |
| 7,118,262 B2 | 10/2006 | Negley |
| 7,147,324 B2 | 12/2006 | Jannard et al. |
| 7,150,526 B2 | 12/2006 | Jannard et al. |

| | | |
|---|---|---|
| 7,213,917 B2 | 5/2007 | Jannard et al. |
| 7,216,973 B2 | 5/2007 | Jannard et al. |
| 7,226,180 B2 | 6/2007 | Sung |
| 7,234,831 B1 | 6/2007 | Hanley |
| 7,255,437 B2 | 8/2007 | Howell et al. |
| 7,264,350 B2 | 9/2007 | Jannard et al. |
| D553,177 S | 10/2007 | Chen |
| 7,278,734 B2 | 10/2007 | Jannard et al. |
| 7,281,826 B2 | 10/2007 | Huang |
| D568,922 S | 5/2008 | Anderl |
| 7,377,664 B2 | 5/2008 | Waters |
| 7,422,324 B2 | 9/2008 | Lee |
| 7,438,409 B2 | 10/2008 | Jordan |
| 7,562,979 B2 | 7/2009 | Waters |
| D600,738 S | 9/2009 | Su et al. |
| 7,607,775 B2 | 10/2009 | Hermanson et al. |
| 7,661,818 B2 | 2/2010 | Waters |
| D611,086 S | 3/2010 | Meng-Suen |
| 7,699,486 B1 | 4/2010 | Beiner |
| D617,826 S | 6/2010 | Waters |
| 7,862,979 B2 | 1/2011 | Morris et al. |
| 7,938,553 B1 | 5/2011 | Beiner |
| 7,942,522 B2 | 5/2011 | Sonsino |
| 7,946,705 B1 | 5/2011 | Hsu |
| 7,997,724 B1 | 8/2011 | Hsu |
| 8,007,101 B1 * | 8/2011 | Wang .......................... 351/158 |
| 8,109,630 B2 | 2/2012 | Sonsino |
| 8,152,330 B2 | 4/2012 | Waters |
| 8,235,524 B2 | 8/2012 | Waters |
| 2002/0131275 A1 | 9/2002 | Yamamoto et al. |
| 2002/0163800 A1 | 11/2002 | Hansen |
| 2002/0186557 A1 | 12/2002 | Lary et al. |
| 2002/0187806 A1 | 12/2002 | Jang |
| 2003/0079387 A1 | 5/2003 | Derose |
| 2003/0086053 A1 | 5/2003 | Waters |
| 2003/0086054 A1 | 5/2003 | Waters |
| 2003/0169207 A1 | 9/2003 | Beigel |
| 2003/0189824 A1 | 10/2003 | Meeder et al. |
| 2003/0206269 A1 | 11/2003 | Waters |
| 2004/0222638 A1 | 11/2004 | Bednyak |
| 2004/0240067 A1 | 12/2004 | Marusi et al. |
| 2004/0240204 A1 | 12/2004 | Russ et al. |
| 2004/0264176 A1 | 12/2004 | Vanderschuit |
| 2005/0001433 A1 | 1/2005 | Seelin |
| 2005/0072458 A1 | 4/2005 | Goldstein |
| 2005/0099799 A1 | 5/2005 | Cugini et al. |
| 2005/0204490 A1 | 9/2005 | Kemp et al. |
| 2005/0211187 A1 | 9/2005 | Harman et al. |
| 2005/0248932 A1 | 11/2005 | Waters |
| 2005/0254238 A1 | 11/2005 | Parker et al. |
| 2005/0265015 A1 | 12/2005 | Salazar |
| 2006/0012974 A1 | 1/2006 | Su |
| 2006/0012975 A1 | 1/2006 | Huttner et al. |
| 2006/0091784 A1 | 5/2006 | Conner et al. |
| 2006/0091787 A1 | 5/2006 | Kabay et al. |
| 2006/0092621 A1 | 5/2006 | Lai |
| 2006/0138440 A1 | 6/2006 | Jyo |
| 2006/0158895 A1 | 7/2006 | Brands et al. |
| 2006/0197905 A1 | 9/2006 | Lu |
| 2006/0198122 A1 | 9/2006 | Senter et al. |
| 2006/0232239 A1 | 10/2006 | Maglica et al. |
| 2006/0238995 A1 | 10/2006 | Wang |
| 2006/0239018 A1 | 10/2006 | Jardin |
| 2006/0291193 A1 | 12/2006 | Hill |
| 2007/0013865 A1 | 1/2007 | Joradn |
| 2007/0030442 A1 | 2/2007 | Howell et al. |
| 2007/0053179 A1 | 3/2007 | Pang et al. |
| 2007/0058361 A1 | 3/2007 | Sevilla |
| 2007/0074752 A1 | 4/2007 | Shau et al. |
| 2007/0127250 A1 | 6/2007 | Waters |
| 2007/0145746 A1 | 6/2007 | Biamonte |
| 2007/0153500 A1 | 7/2007 | Waters |
| 2007/0153537 A1 | 7/2007 | Scott et al. |
| 2007/0159810 A1 | 7/2007 | Kim |
| 2007/0159823 A1 | 7/2007 | Ho et al. |
| 2007/0189003 A1 | 8/2007 | Daley |
| 2007/0206373 A1 | 9/2007 | Whiteside et al. |
| 2007/0236649 A1 | 10/2007 | Lin |
| 2007/0236915 A1 | 10/2007 | Chen |
| 2007/0236916 A1 | 10/2007 | Hsu |
| 2008/0069391 A1 | 3/2008 | Steyn et al. |
| 2008/0130272 A1 | 6/2008 | Waters |
| 2009/0190026 A1 | 7/2009 | Chen |
| 2009/0213323 A1 | 8/2009 | Mermanson et al. |
| 2010/0134761 A1 | 6/2010 | Johns et al. |
| 2010/0182563 A1 | 7/2010 | Waters |
| 2011/0013135 A1 | 1/2011 | Waters |
| 2011/0075095 A1 | 3/2011 | Waters |
| 2011/0187989 A1 | 8/2011 | Waters |
| 2011/0211156 A1 | 9/2011 | Beiner |
| 2012/0062830 A1 | 3/2012 | Waters |
| 2012/0155064 A1 | 6/2012 | Waters |

FOREIGN PATENT DOCUMENTS

| | | |
|---|---|---|
| CA | 2610073 A1 | 5/2008 |
| CN | 1603677 A | 4/2005 |
| CN | 2826472 Y | 10/2006 |
| CN | 201548769 U | 8/2010 |
| CN | 101950091 A | 1/2011 |
| CN | 201707513 U | 1/2011 |
| CN | 301445845 S | 1/2011 |
| CN | 201796205 U | 4/2011 |
| DE | 3043007 | 6/1982 |
| DE | 9410886 | 9/1994 |
| EP | 1451633 | 9/2004 |
| EP | 2 290 433 A1 | 3/2011 |
| EP | 2 299 311 A1 | 3/2011 |
| EP | 2 350 734 | 8/2011 |
| GB | 2272073 A | 5/1994 |
| JP | 2004-207580 A | 7/2004 |
| WO | 01/13033 A1 | 2/2001 |
| WO | 01/77575 A1 | 10/2001 |
| WO | 2003/040808 | 5/2003 |
| WO | 2006/124928 A1 | 11/2006 |
| WO | 2007/058706 A2 | 5/2007 |
| WO | 2011/041591 A1 | 4/2011 |
| WO | 2011/100471 A1 | 8/2011 |
| ZA | 2004/3826 A | 9/2005 |

OTHER PUBLICATIONS

"Defendant's Answer, Affirmative Defenses and Counterclaim", *Waters Industries, Inc. v. JJI International, Inc.*, United States District Court of the Northern District of Illinois, Case No. 1:12-cv-06195, 9 pages (Sep. 4, 2012).

"Plaintiff's Answer to Defendant's Counterclaims", *Waters Industries, Inc. v. JJI International, Inc.*, United States District Court of the Northern District of Illinois, Case No. 1:12-cv-06195, 4 pages (Sep. 28, 2012).

"Plaintiff's Initial Infringement Contentions Under Local Patent Rule 2.2" with Appendix A through B, *Waters Industries, Inc. v. JJI International, Inc.*, United States District Court of the Northern District of Illinois, Case No. 1:12-cv-06195, 30 pages (Oct. 2, 2012).

"Defendant's Initial Non-Infringement and Invalidity Contentions" with Appendix A through B and Figure D1, *Waters Industries, Inc. v. JJI International, Inc.*, United States District Court of the Northern District of Illinois, Case No. 1:12-cv-06195, 31 pages (Oct. 16, 2012).

Notification of Transmittal of the International Search Report and the Written Opinion of the International Searching Authority, or the Declaration from the International Bureau of WIPO for International Application No. PCT/US2011/051596, dated Jan. 18, 2012, 9 pages.

"Defendants' Final Invalidity Contentions" with Appendix A though D, *Waters Industries, Inc. v. JJI International, Inc. and Stein Mart, Inc.*, United States District Court for the Northern District of Illinois, Case No. 1:11-cv-03791, 33 pages (Feb. 21, 2012).

"Plaintiff's Final Infringement Contentions Under Local Patent Rule 3.1" with Appendix A though F, *Waters industries, Inc. v. JJI International, Inc. and Stein Mart, Inc.*, United States District Court for the Northern District of Illinois, Case No. 1:11-cv-03791, 58 pages (Feb. 21, 2012).

"Plaintiff's Response to Defendants' Final Invalidity Contentions Under Local Patent Rule 3.2" with Appendix A though D-4, *Waters Industries, Inc. v. JJI International, Inc. and Stein Mart, Inc.*, United States District Court for the Northern District of Illinois, Case No. 1:11-cv-03791, 73 pages (Mar. 19, 2012).
Office Action issued in related Canadian Application No. 2,466,175 dated Sep. 22, 2010 (3 pages).
Supplementary European search report issued in the related European Application No. 02 77 8755 dated Jan. 19, 2005 (2 pages).
Office Action issued in related European Application No. 02 778 755.5 dated Feb. 20, 2007 (7 pages).
Extended European search report issued in the related European Application No. 10 18 1592.6 dated Jan. 31, 2011 (7 pages).
Extended European search report issued in the related European Application No. 10 18 1593.4 dated Feb. 1, 2011 (8 pages).
International Search Report from the International Bureau of WIPO issued in the related International Application No. PCT/US02/35665, dated Jun. 27, 2003, 1 page.
Written Opinion of the International Searching Authority and International Search Report from the International Bureau of WIPO for International Application No. PCT/US2006/018968, dated Oct. 16, 2006, 7 pages.
Notification of Transmittal of the International Search Report and the Written Opinion of the International Searching Authority, or the Declaration from the International Bureau of WIPO for International Application No. PCT/US10/50978, dated Dec. 3, 2010, 16 pages.
Notification of Transmittal of the International Search Report and the Written Opinion of the International Searching Authority, or the Declaration from the International Bureau of WIPO for International Application No. PCT/US2011/024400, dated Apr. 29, 2011, 13 pages.
Docket report of *Waters Industries, Inc.* v. *Mr. Christmas Incorporated, et al.*, United States District Court for the Northern District of Illinois, Case No. 1:09-cv-07577, filed Dec. 7, 2009, 5 pages.
"Complaint", *Waters Industries, Inc.* v. *Mr. Christmas Incorporated, et al.*, United States District Court for the Northern District of Illinois, Case No. 1:09-cv-07577, 38 pages (Dec. 7, 2009).
Docket report of *Waters Industries, Inc.* v. *The Gerson Company*, United States District Court for the Northern District of Illinois, Case No. 1:10-cv-01865, filed Mar. 24, 2010, 3 pages.
"Complaint", *Waters Industries, Inc.* v. *The Gerson Company*, United States District Court for the Northern District of Illinois, Case No. 1:10-cv-01865, 71 pages (Mar. 24, 2010).
Docket report of *Waters Industries, Inc.* v. *Sweet Baby, Inc. dba AJ Morgan et al.*, United States District Court for the Northern District of Illinois, Case No. 1:09-cv-07595, filed Dec. 7, 2009, 7 pages.
"Complaint", *Waters Industries, Inc.* v. *Sweet Baby, Inc. dba AJ Morgan et al.*, United States District Court for the Northern District of Illinois, Case No. 1:09-cv-07595, 78 pages (Dec. 7, 2009).

"Answer to Complaint, Counterclaims", filed by Sweet Baby, Inc. dba AJ Morgan, *Waters Industries, Inc.* v. *Sweet Baby, Inc. dba AJ Morgan et al.*, United States District Court for the Northern District of Illinois, Case No. 1:09-cv-07595, 15 pages (Feb. 4, 2010).
"Answer to Complaint, Counterclaims", filed by Lilian Vernon Corporation, *Waters Industries, Inc.* v. *Sweet Baby, Inc. dba AJ Morgan et al.*, United States District Court for the Northern District of Illinois, Case No. 1:09-cv-07595, 15 pages (Feb. 4, 2010).
Docket report of *Waters Industries, Inc.* v. *Kikkerland Design, Inc.*, United States District Court for the Northern District of Illinois, Case No. 1:10-cv-04076, filed Jun. 30, 2010, 4 pages.
"Complaint", *Waters Industries, Inc.* v. *Kikkerland Design, Inc.*, United States District Court for the Northern District of Illinois, Case No. 1:10-cv-04076, 21 pages (Jun. 30, 2010).
"Kikkerland Design, Inc.'s Answer to Complaint, Affirmative Defenses and Counterclaim", *Waters Industries, Inc.* v. *Kikkerland Design, Inc.*, United States District Court for the Northern District of Illinois, Case No. 1:10-cv-04076, 12 pages (Aug. 6, 2010).
"Complaint" with Exhibit A through D, *Waters Industries, Inc.* v. *JJI International, Inc., et al.*, United States District Court for the Northern District of Illinois, Case No. 1:11-cv-03791, 73 pages (Document No. 1, Jun. 3, 2011).
"Defendants' Answer and Counterclaim" and "Responses to Specific Allegations", *Waters Industries, Inc.* v. *JJI International, Inc. and Stein Mart, Inc.*, United States District Court for the Northern District of Illinois, Case No. 1:11-cv-03791, 16 pages (Document No. 15, Jun. 28, 2011).
"Plaintiff's Initial Infringement Contentions Under Local Patent Rule 2.2" with Appendix A through F, *Waters Industries, Inc.* v. *JJI International, Inc. and Stein Mart, Inc.*, United States District Court for the Northern District of Illinois, Case No. 1:11-cv-03791, 44 pages (Jul. 26, 2011).
"Defendants' Initial Non-Infringement and Invalidity Contentions" with Appendix A though G, *Waters Industries, Inc.* v. *JJI International, Inc. and Stein Mart, Inc.*, United States District Court for the Northern District of Illinois, Case No. 1:11-cv-03791, 78 pages (Aug. 9, 2011).
"Plaintiff's Initial Response to Invalidity Contentions Under Local Patent Rule 2.5" with Appendix A and B, *Waters Industries, Inc.* v. *JJI International, Inc. and Stein Mart, Inc.*, United States District Court for the Northern District of Illinois, Case No. 1:11-cv-03791, 29 pages (Aug. 23, 2011).

\* cited by examiner

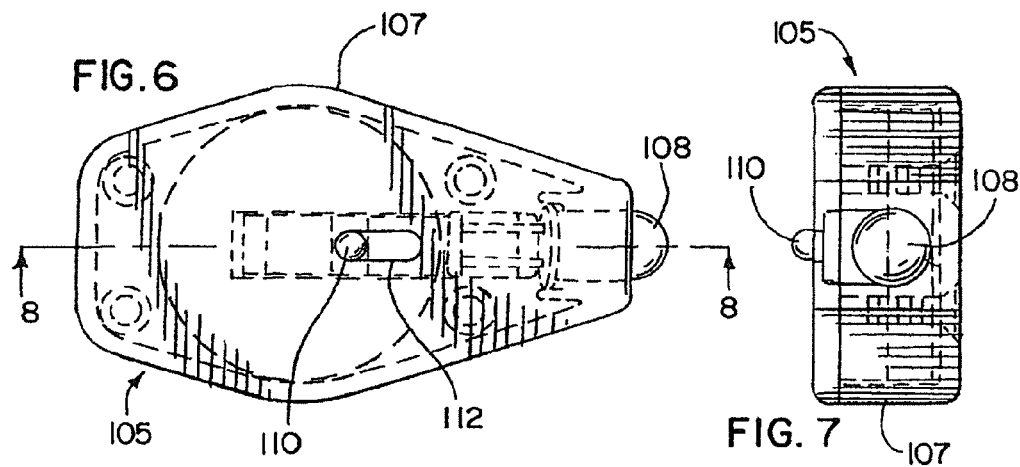
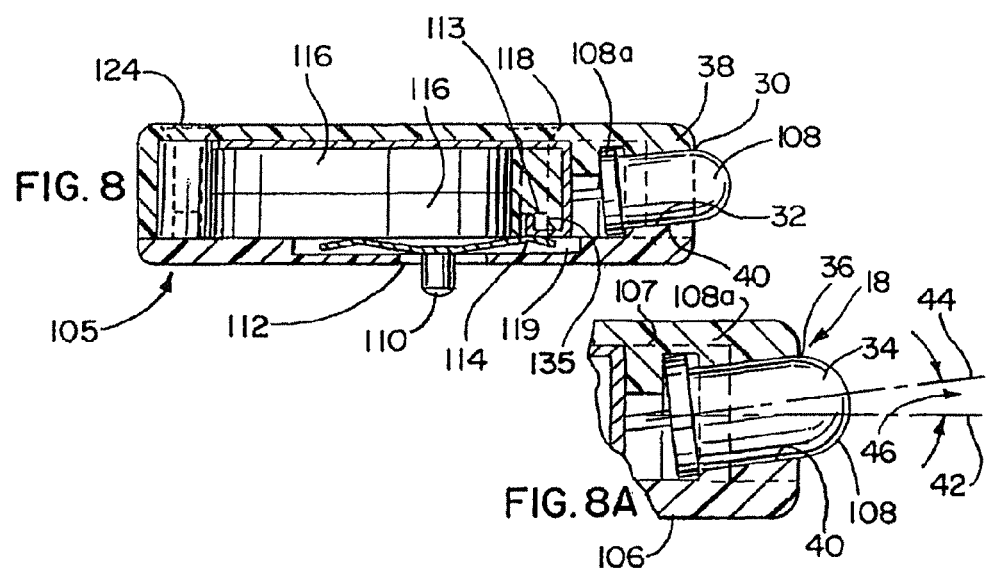

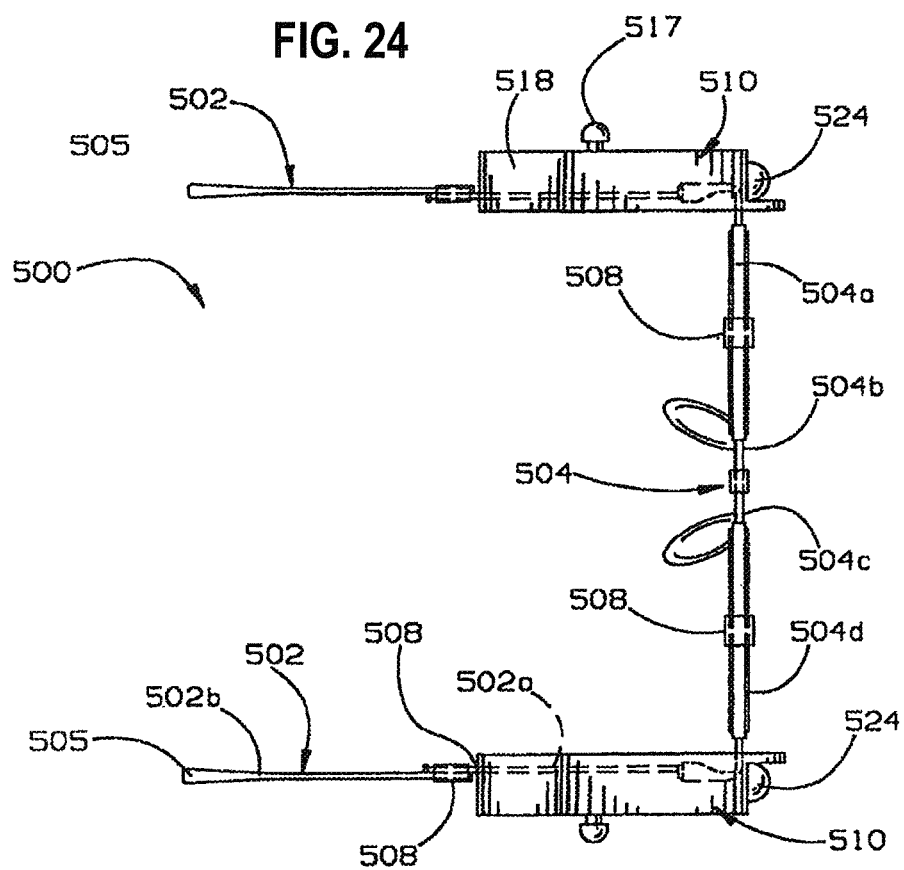
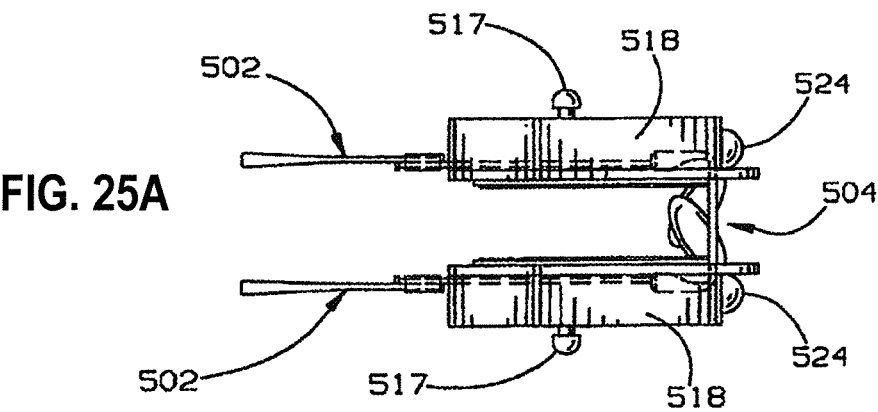

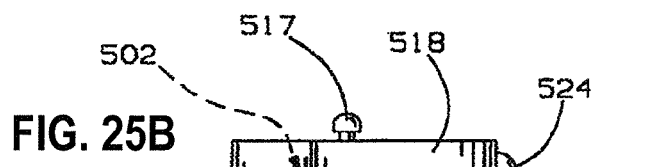
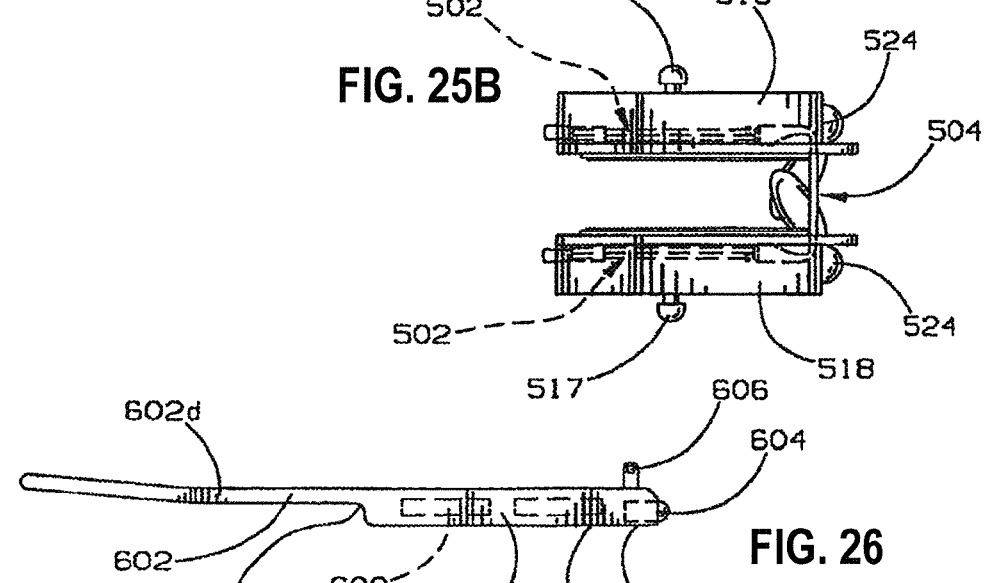
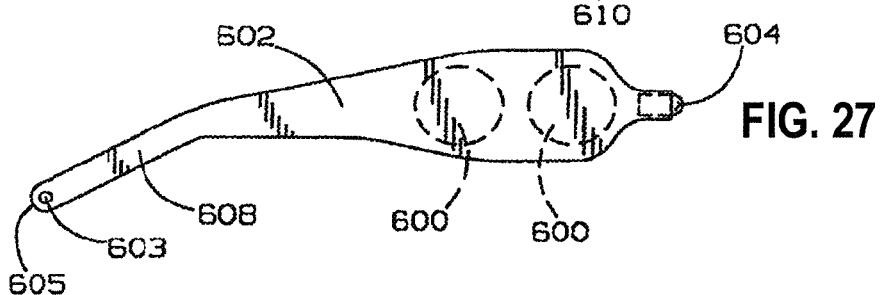
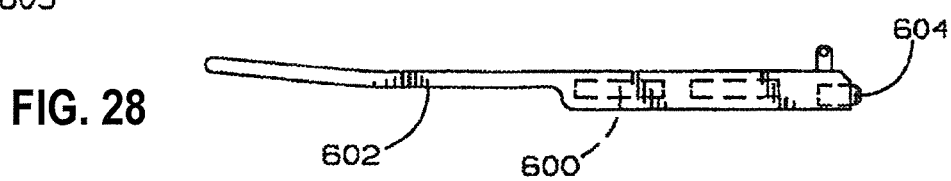
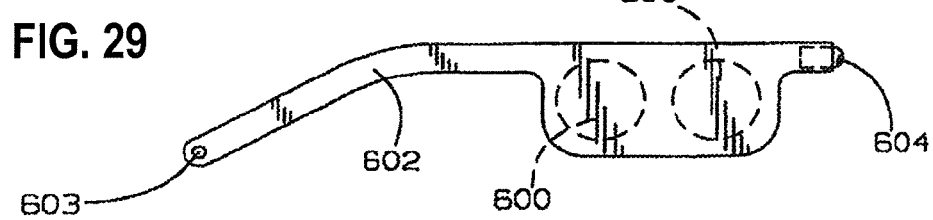

FIG. 30
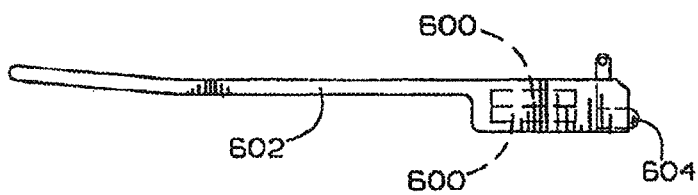
FIG. 31
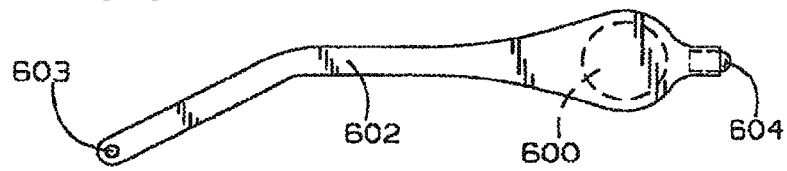
FIG. 32
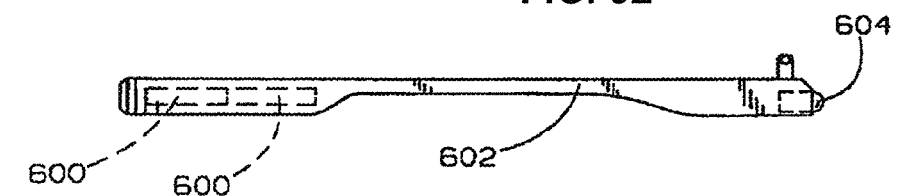
FIG. 33
FIG. 34
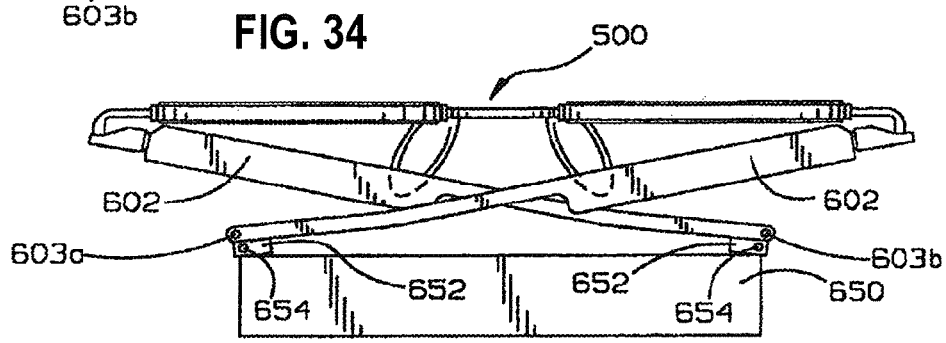

LIGHTED READING GLASSES

CROSS-REFERENCE TO RELATED APPLICATIONS

This application is a continuation-in-part of U.S. application Ser. No. 12/687,822, filed Jan. 14, 2010, now U.S. Pat. No. 8,152,330, which is a continuation of U.S. application Ser. No. 11/557,748, filed Nov. 8, 2006, now U.S. Pat. No. 7,661,818, which is a continuation-in-part of U.S. application Ser. No. 10/571,796, filed Mar. 15, 2007, now U.S. Pat. No. 7,562,979, which is a National Phase Entry of PCT/US2002/35665, filed Nov. 7, 2002, which is a continuation-in-part of U.S. application Ser. No. 10/145,595, filed May 14, 2002, now U.S. Pat. No. 6,612,696, which is a continuation-in-part of U.S. application Ser. No. 10/006,919, filed Nov. 7, 2001, now U.S. Pat. No. 6,612,695, which are all hereby incorporated herein by reference in their entirety.

This application is also a continuation-in-part of U.S. application Ser. No. 12/895,456, filed Sep. 30, 2010, which claims the benefit of U.S. Provisional Application No. 61/247,243, filed Sep. 30, 2009, and is a continuation-in-part of U.S. application Ser. No. 11/941,558, filed Nov. 16, 2007, now U.S. Pat. No. 8,388,164, which is a continuation-in-part of PCT/US2006/018968, filed May 17, 2006, which claims the benefit of U.S. Provisional Application Nos. 60/681,852, filed May 17, 2005, and 60/746,217, filed May 2, 2006, which are all hereby incorporated herein by reference in their entirety.

FIELD OF THE INVENTION

The invention relates to hands-free lighting devices and, more particularly, to illuminated eyewear.

BACKGROUND OF THE INVENTION

The use of lights and other illuminating devices with glasses are known. Generally, however, they have not been very well adapted for use with reading glasses. As is known, these types of glasses typically are not worn all the time, and are subject to being frequently taken off and put back on. On the other hand, when reading glasses are worn, they should be comfortable enough to encourage their use so that people are not avoiding their glasses and instead straining their eyes to read.

Incandescent light bulbs commonly have been proposed for use with lighted glasses. Unfortunately, such lighting devices generate a significant amount of heat. Smaller, less powerful incandescent lights still may make the wearer feel quite uncomfortable after even a short while due to the proximity of the light source and the wearer's face. Further decreasing the size of the incandescent lights, to the point where the wearer is comfortable, may cause light output to be very dim and therefore unusable for illuminating reading material that are held at distances optimal for reading.

For example, if reading distance after using corrective lenses for those in need of vision correction of ordinary size text, e.g. 10 or 12 point font, e.g. about six to twenty four inches, and is optimally ten to eighteen inches from the eyes, a light that is capable of brightly illuminating the pages within that range of distances is necessary for ensuring comfort in reading in dimly lighted areas. However, a lower intensity light bulb, which may be preferable to reduce heat or increase battery life, may result in less than optimal lighting at the optimal reading distance, causing eye-strain and discomfort. In other words, the lower intensity of the light source will result in a decrease in the brightness of the light on the page so that the text to be read is only dimly lit.

The use of fiber optic lighting devices instead of incandescent light bulbs is known. In such devices, optical fibers are bundled together to create a light producing device. The nature of fiber optics is such that there is no heat generated at the point where the light is typically transmitted; that is, adjacent the user's temple. Unfortunately, such devices suffer from a rather major limitation. Namely, a very intense and powerful light source must be available to provide light to the optical fibers. As such, head gear such as worn by surgeons having a fiber optic lighting device must at all times stay tethered to a fiber optic light source, which severely restricts the mobility of the user and thus the ease of use of the headgear. A portable light source that stays connected to the fiber optic light head via electrical cables is less than desirable in terms of the need to be able to conveniently carry the light source, and the inconveniences associated with dangling connecting lines.

An additional problem that exists with fiber optic devices, as well as incandescent lighting devices, is rapid battery consumption. Incandescent light bulbs are known to consume large amounts of power. Similarly, a fiber optic device, since it requires a strong lighting source, also requires a large amount of power. As a result, the user is forced to change batteries often or stay tethered to a constant power source or light source.

Another disadvantage in prior art lighting devices is the manner in which surfaces are illuminated. Lighting devices used in the medical field generally produce a single fixed narrow beam of light to brightly illuminate the particular stationary body area on which the doctor may be operating. However, such a single narrow beam would not be particularly helpful in reading textual material as the beam would have to be continually shifted across the page being read. On the other hand, lights used with glasses generally tend to be very inefficient in their use of the light they generate as large amounts of light are cast beyond the field of view of the glasses. Adjustable lights are less than desirable as they require a user to make sure the lights are properly positioned each time the glasses are used.

Accordingly, there is a need for lighted glasses that are optimized for use in poorly lit or dim areas. More particularly, reading glasses having lights that are arranged to direct an optimum amount of light to the area where it is required most, i.e. the reading area, is needed. Further, lights that are very compact and lightweight, while still providing the necessary lighting strength and having a sufficiently long life for the power source that power these lights would be desirable.

Some prior lighted glasses have separate and bulky lighting modules fastened to the glasses such as disclosed in U.S. Pat. No. 5,541,767 to Murphy et al.; U.S. Pat. No. 4,959,760 to Wu; and U.S. Pat. No. 3,769,663 to Perl. Because of their large lighting modules, these glasses are bulky and may be fairly heavy making them inconvenient for a user to wear. Further, these prior lighted glasses conspicuously mount the lighting modules to the glasses or incorporate electronic components for the lighting therein so that the presence of the light modules or electronic components is visually prominent when the glasses are worn, giving the glasses an unsightly appearance.

Prior lighted glasses are also known where lighting components including the light and power sources and the light switch are distributed along the eyeglass frame by mounting the light source to the front cross-frame member of the glasses and then mounting the other electrical components for the light source to the temple arms. In one arrangement, wires of the electrical components are run from the power source to the light source across the pivot connections between the temple arms and the front cross-frame member, such as disclosed in U.S. Pat. No. 5,946,071 to Feldman and U.S. Pat. No. 5,722,762 to Soll. These glasses, however, can complicate the pivoting action between the temple arms and the front frame member due to the wires spanning the pivot connection between the temple arms and front, cross-frame member of the glasses. If the wires are run outside of the frame of the glasses, the glasses are provided with an unsightly appearance.

SUMMARY OF THE INVENTION

In accordance with one form of the invention, lighted glasses, and preferably those adapted for reading which include corrective lenses, e.g. magnifiers, are provided to enable conventional sized text to be clearly read in dimly lit areas when held at a normal range of reading distances at which a user typically reads such material, such as between ten inches and eighteen inches from the lenses. High strength lights and light mounts therefor cooperate to light the reading area with a maximum amount of light provided in the reading distance range. More particularly, highly efficient and high intensity light emitting diodes (LEDs) are mounted in housings configured to fix narrow beams of light to be directed slightly inward toward each other so that the beams overlap in the reading distance range thus providing double the amount of light for reading over that provided by a single one of the lights. To this end, the housings are attached adjacent outer portions of the lenses so that the inwardly directed light beams light up the areas generally in front of the glasses, i.e. in its field of view, and which begins spaced forwardly therefrom, i.e. generally coinciding with the start of the reading distance range. Further, the small size and efficient nature of the preferred solid-state material, i.e. InGaN (indium gallium nitride), for the LEDs, allows very small power supplies to be used such as disc-shaped coin cell batteries for powering the LEDs which, in turn, allows both the light source and power source herein to be self-contained in a highly compact housing therefor. In this regard, the present invention also contemplates the provision of compactly sized lighting modules as described above that can be attached to reading or other glasses either removably or fixed in a more permanent fashion as described hereinafter, or to other items typically worn as headgear such as hats or the like.

The beams of light from the LEDs generate conical-shaped lighted areas such that upon intersection they cooperate to form a conical overlapping lighted area in which the brightness of the light is effectively doubled over that provided by a single LED. The conical overlapping lighted area increases in size as distances increase from the lenses. As is known, light tends to dissipate the further it is from its source. The overlapping conical lighted area is such that the peripheral areas in the field of view of the lenses that do not receive the double light strength of the overlapping light beams are closest to the lenses where light dissipation has its least effect in the reading distance range, whereas the overlapping lighted area increases in size further from the lenses with a corresponding decrease in the single light strength peripheral areas on either side of the cone of overlapping light. Thus, as light dissipates and distances increase from the lenses, the lighting provided will not suffer as the double light strength of the overlapping conical region of light will more than make up for the effects of light dissipation in the reading distance range.

To achieve the optimum amount of light flooding in the reading area, the light housings have surfaces configured to orient the central axis of the conical light beams in a direction that is canted slightly inward with the beams directed toward each other. The preferred canting of the narrow light beams which in the preferred and illustrated form are cones forming angles of twenty degrees is such that the cone axis has a fifteen degree angle with a reference line extending straight forwardly from the lenses. The lenses are preferably magnifiers of a predetermined diopter rating selected by a user so that conventionally sized text such as ten or twelve point font can be clearly read at distances ranging from between approximately six to twenty four inches, and optimally approximately ten and eighteen inches forwardly of the user. And it is in this distance range where the overlapping cone of light is formed by the conical light beams canted inward toward each other, as described. In this way, the present lighted reading glasses are provided with lights whose light beams are directed in a carefully coordinated manner with the vision correction provided by the corrective reading lenses so that the amount of light is maximized where it is needed most, i.e. in the field of view of the lenses and within the range of distances at which conventional sized printed text is most commonly read.

In a preferred form, the glasses include temple arms that extend rearwardly from the outer portions of the lenses with the housings attached to the arms toward the forward ends thereof. The temple arms can be opened for use or folded when not in use. With the temple arms opened, the housings are each oriented to project light therefrom forwardly inwardly and toward the light emanating from the housing attached on the other arm. The temple arms toward their forward ends typically will extend substantially straight rearwardly generally normal to the lens frame portions so that the longitudinal axis of the housing is likewise in a normal orientation to the lens frame with the mounting surfaces of the housing configured to be canted inwardly therefrom to direct the light beams as earlier described. Should the configuration of the temple arms and/or housings vary from that described herein, the mounting surfaces can be configured to adapt accordingly such that the light beams are inwardly directed as desired.

The preferred LEDs herein are a small lightweight device that provides a very bright light, while consuming very little power. As such, the batteries enclosed in the housing are small and do not need to be changed as frequently as devices that utilize incandescent lights or fiber optics, which require large batteries. The LEDs provide a relatively narrow beam of light that can be well focused in a particular direction. For example, if two light modules are mounted on a pair of glasses, the LEDs in each module are positioned such that the cones of light produced by the LEDs in the light modules begin intersecting at a point closely adjacent to or coinciding with the start of the range of ideal reading distances. As such, the illuminated reading portion receives the brightest light possible since the intersection of both cones of light are trained on that area. Another advantage of using the high intensity LEDs is that because they consume such a small amount of power, virtually no heat is dissipated. Therefore, a user is able to wear eyeglasses having the light modules mounted thereon, for longer periods of time without suffering from heat and without being bothered by the weight of the devices.

Illuminated eyewear is also provided that directs light forwardly from the user when wearing the eyewear. The illuminated eyewear herein is in the form of eyeglasses, either with or without lenses, or with a lens or lenses that can be refractive or non-refractive, that in one aspect has the lights arranged so as to optimize their performance. In another aspect, the illustrated eyewear herein has electrical components for the lights arranged to provide enhanced aesthetics over prior lighted eyeglasses.

In one form, the eyewear includes a pair of temple arm members where each temple arm member has a forward and rearward end. Each temple arm member also has inner and outer surface portions that have a flat configuration and extend lengthwise between the forward and rearward ends of the respective temple arm members. The eyewear further includes a front support including, at least in part, a bridge portion that extends between the forward ends of the temple arms members. Hinge connections couple the temple arm members with the front support allowing the temple arm members to pivot relative thereto. The eyewear also includes a light source mounted to each temple arm and a plurality of thin, compact generally flat batteries, such as conventional disc-shaped coin-cell batteries, for providing power to the light sources. Peripheral shapes for the flat batteries other than circular are also contemplated such as with rechargeable coin-cell batteries that have an oblong configuration. Each temple arm member includes a narrow width battery compartment positioned between the flat inner surface portion and the flat outer surface portion of the temple arm member. The narrow width battery compartments are sized so that a pair of thin, flat batteries may be received in a non-overlapping, side-by-side arrangement with main flat surfaces of the batteries facing the flat inner and outer surface portions of the respective temple arm members. The plurality of batteries are connected to the light sources by an electrical connection to be powered thereby. Accordingly, for each temple arm member, the light source, the associated batteries, and the electrical connection therebetween are mounted to the temple member so that there are no electrical components that span the hinge connections between the temple arm members and the front support.

So configured, the illuminated eyewear has temple arm members that maintain a narrow width while at the same time also include all of the lighting components in the temple arm members. This configuration of eyewear that mounts the light source, batteries, and the electrical connection therebetween all in the respective temple arm members avoids the unsatisfactory performance issues associated with prior hinge switches because electrical power is not routed through or otherwise reliant on operation of a hinge. Moreover, by employing a narrow width battery compartment between the inner and outer surface of the temple arm members to receive the pair of thin, flat batteries in a non-overlapping and side-by-side arrangement, the eyewear, and in particular, the temple arm members, retain an appearance as they would with traditional eyeglasses. The narrow battery compartment and side-by-side arrangement of the thin, flat batteries eliminates bulky and unsightly modules and large bulges in the eyeglass frame to house batteries such as with conventional, generally cylindrical flashlight batteries and avoids the unsightly appearance this arrangement creates as can be seen in the prior lighted glasses such as shown in U.S. Pat. No. 2,638,532 to Brady.

In another form, the eyewear includes a front support including, at least in part, a bridge portion that generally extends laterally along a lateral axis. The eyewear further includes a pair of temple arm members and a hinge connection between each of the temple arm members and the front support. So configured, the temple arm members are pivotal between a use configuration with the temple arm members extending rearwardly from the front support along respective fore-and-aft axes that are generally orthogonal to the lateral axis, and a storage configuration with the temple arm members generally extending laterally adjacent to the front support along the lateral axis. Adjacent to each of the hinge connections are a front frame portion and a light source. Each front frame portion includes a blinder surface adjacent the light source and at a laterally inward location therefrom. The binder surface extends transversely to the lateral axis, and preferably at a laterally inward cant obliquely to the lateral axis to be inclined relative thereto.

So configured, the blinder surfaces minimize incident light from the light sources from causing glare when the temple arms are pivoted to the use configuration and the illuminated eyewear is worn with the lights on.

In a preferred form, the light sources are LEDs that have a predetermined light cone such as 40 degree LEDs, and the preferred canted blinder surfaces are inclined to the lateral axis in a manner to avoid significant interference with the cones of light generated by the LEDs while blocking incident light outside the light cones from reaching the eyes of the wearer of the lighted eyeglasses. Most preferably, the inclination of the blinder surfaces is substantially matched to the angle of the light cone so that only incident light from the LEDs is blocked by the blinder surfaces.

In another aspect, the illuminated eyewear has a cross-frame member that includes the front frame portions so that the blinder surfaces are integrated in the cross-frame member. The front frame portions are at lateral ends of the cross-frame member and extend laterally and rearwardly to the pivot connections with the temple arm members at their forward ends, at which the LEDs are mounted. Thus, when the temple arm members are pivoted to their use configuration, this pivots the LEDs to be adjacent a rear portion of the inclined blinder surfaces integrated into the cross-frame member. In a preferred form, the blinder surfaces each can be formed as a generally semi-frustoconical surface so that a notch opening is formed at the rearward end of the semi-frustoconical surface into which the LED is pivoted when the temple arm members are pivoted open to their use configuration.

In yet another form, the illuminated eyewear includes a pair of temple arm members with each temple arm member having forward and rearward ends, and a front support including, at least in part, a bridge portion that extends laterally between the forward ends of the temple arm members. A hinge is provided between each of the forward ends of the temple arm members and the laterally extending front support that allows each temple arm member to be shifted between an open configuration, where the temple arm members are pivoted away from the laterally extending front support to extend rearwardly therefrom, and a closed configuration, where the temple arm members are pivoted toward the laterally extending front support to extend therealong adjacent thereto. Each temple arm member includes a light source mounted thereto for projecting light therefrom, a power source for providing power to the light source, and a switch for turning the light source on and off. Each temple arm member also includes a laterally inner surface portion that generally faces laterally inwardly toward the other laterally inner surface portion when the temple arm members are shifted to the open configuration. Each laterally inner surface portion includes a recessed cavity sized to receive the power source and the switch therein such that the presence of the power source and the switch is substantially hidden from view.

By providing the cavity for the power source and switch recessed into the laterally inner surface portion of the temple arm member, the illuminated eyewear in this form has an appearance more similar to conventional non-illuminated eyewear. For example, prior lighted eyeglasses commonly have light modules mounted to an outer surface of eyeglass temple arms facing laterally outward therefrom. Configured this way, the light module projects outwardly from the laterally outer facing surface, making the eyewear significantly wider and prominently displaying the module so it can be readily seen when the lighted eyeglasses are worn. Likewise, prior lighted eyeglasses with a battery compartment recessed into the outer surfaces of the temple arms expose the battery compartment cover so that it is readily visible when the eyeglasses are worn. These conspicuous displays of lighting components in prior lighted eyeglasses detract from the aesthetics and appearance of the eyewear. The illuminated eyewear of this form, on the other hand, has all of the lighting components mounted to the temple arm members and concealed therein in a manner so that it is not immediately apparent that the illumination components are present on the glasses. More specifically, by recessing the compartment for the power source and switch in the inner surface portion of the temple arm, the lighted eyewear herein can appear to be substantially similar to conventional eyeglasses when being worn.

In yet another form, the illuminated eyewear includes a pair of temple arm portions, each having rear end portions configured to rest on a user's ears and opposite forward end portions. The illuminated eyewear further includes a front support portion that includes opposite end portions and an intermediate bridge portion configured to rest on a user's nose. Pivot or hinge connections are positioned between the forward end portions of the temple arm portions and the opposite end portions of the front support portion. So configured, the temple arm portions and the front support portion have a use configuration where the front support portion generally extends along a lateral axis and the temple arm portions extend along longitudinal axes that are generally orthogonal to the lateral axis. A light source is mounted adjacent to each of the pivot connections so as to be canted laterally inwardly from the respective longitudinal axis of the temple arm portion and downwardly from the front support portion to provide forward illumination inwardly and downwardly therefrom. The illuminated eyewear also includes a pair of thin, generally flat batteries for each light source. A portion of each temple arm portion is enlarged in at least two directions orthogonal to each other and orthogonal to the longitudinal axis. Each temple arm enlarged portion has a battery compartment for fitting the pair of batteries in a stacked, overlapping orientation therein.

In this form of the illuminated eyewear, the inward and downward cant of the light source advantageously provides an overlap between the light beams projected by the light sources that is focused forwardly of the wearer in their field of view. Thus, the wearer does not need to tilt or shift their head to align the light sources or orient the illumination to focus the light beams within the wearer's field of view.

BRIEF DESCRIPTION OF THE DRAWINGS

FIG. 6 is a side elevational view of the light module showing the coin cells in phantom and the tapered configuration of the housing from the widest diameter to hold the coin cells therein;

FIG. 7 is a front elevational view of the light module showing the thin configuration of the housing;

FIG. 8 is a cross-sectional view taken along line 8-8 of FIG. 6 showing light mounting surfaces for orienting the LED to project light at an oblique angle to a longitudinal axis of the housing;

FIG. 8A is an enlarged fragmentary view of the forward portion of the module to show more clearly the preferred angle at which the LEDs are mounted in the housing;

FIG. 24 is a plan view of the illuminated eyewear of FIG. 22A showing both of the temple arms and a cross-frame member extending between the forward ends of the arms in an extended position;

FIG. 25A is a plan view of the illuminated eyewear of FIGS. 22A and 22B showing both the temple arms and the cross-frame member in their retracted positions;

FIG. 25B is a plan view of the illuminated eyewear of FIGS. 23A and 23B showing both the temple arms and cross-frame member in their retracted positions;

FIGS. 26-33 are plan and side elevational views of alternative temple portions for illuminated eyewear having integrated power sources and LEDs; and FIG. 34 is a plan view of the illuminated eyewear and a battery charger for recharging the integrated power source of the temple arms.

DETAILED DESCRIPTION OF THE PREFERRED EMBODIMENT

Figure 1:
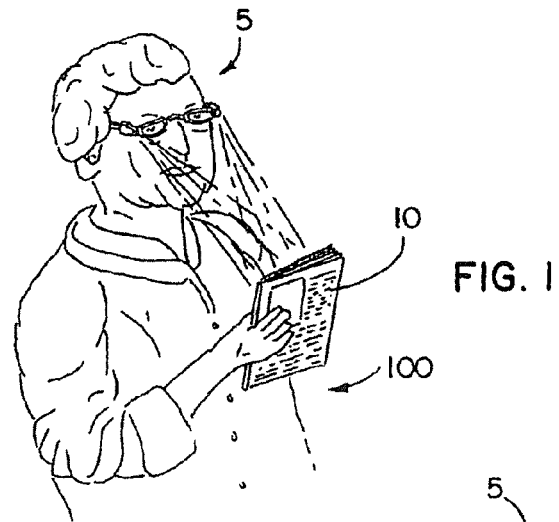
FIG. 1 is a perspective view of lighted reading glasses in accordance with the present invention showing the glasses used to read material held at a normal reading distance range.
Figure 2:
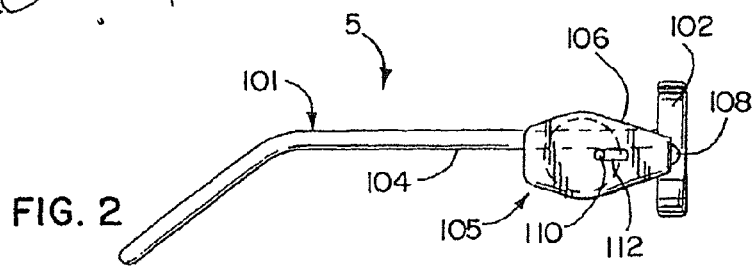
FIG. 2 is a side elevational view of the reading glasses of FIG. 1 showing a lighting module attached to a forward end portion of one of the temple arms of the glasses.

As shown in drawings for purposes of illustration, the invention is embodied in lighted reading glasses 5 which enable a user wearing the glasses 5 as shown in FIG. 1 to clearly read conventionally sized printed text 10, e.g. ten or twelve point font, held in a range of distances suitable for reading such text sizes where the reading is occurring in poorly or dimly lit areas. In this regard, the present lighted reading glasses 5 are ideally suited for use in areas that normally require a user to turn on a light before reading can occur but where doing so is less than desirable, such as in a car or when reading in bed with another present who is trying to sleep while you read.

The lighted glasses 5 which as stated above are preferably reading glasses 5 will include lenses 12 of light transmissive material configured to refract light to correct for defects in vision due to errors of refraction in the human eye and thus, at least one of the lens surfaces 14 will be curved to precisely correct for the defect being addressed in a particular individual that wishes to use the lighted reading glasses 5 herein. A variety of lens types may be utilized including concave, convex, plano-convex, cylindrical, compound lenses and/or bi, tri, or tetrofocal lenses, although the reading glasses 5 are preferably adapted for use by those who are farsighted so that convexly configured lenses 12 will typically be employed. Further, although the reading glasses 5 can be provided with prescription lenses 12, from a cost standpoint the lighted glasses 5 are preferred for use with lower cost magnifier lenses 12 that have a well-defined diopter rating. In this regard, the lenses 12 can be offered with nine different diopter ratings from 1.00 up to 3.00 in intervals of 0.25 therebetween. Alternatively, the lenses 12 can be non-refractive for people who do not need vision correction but still want to read in the dark via the lighting provided by the glasses 5 herein.

Figure 9:
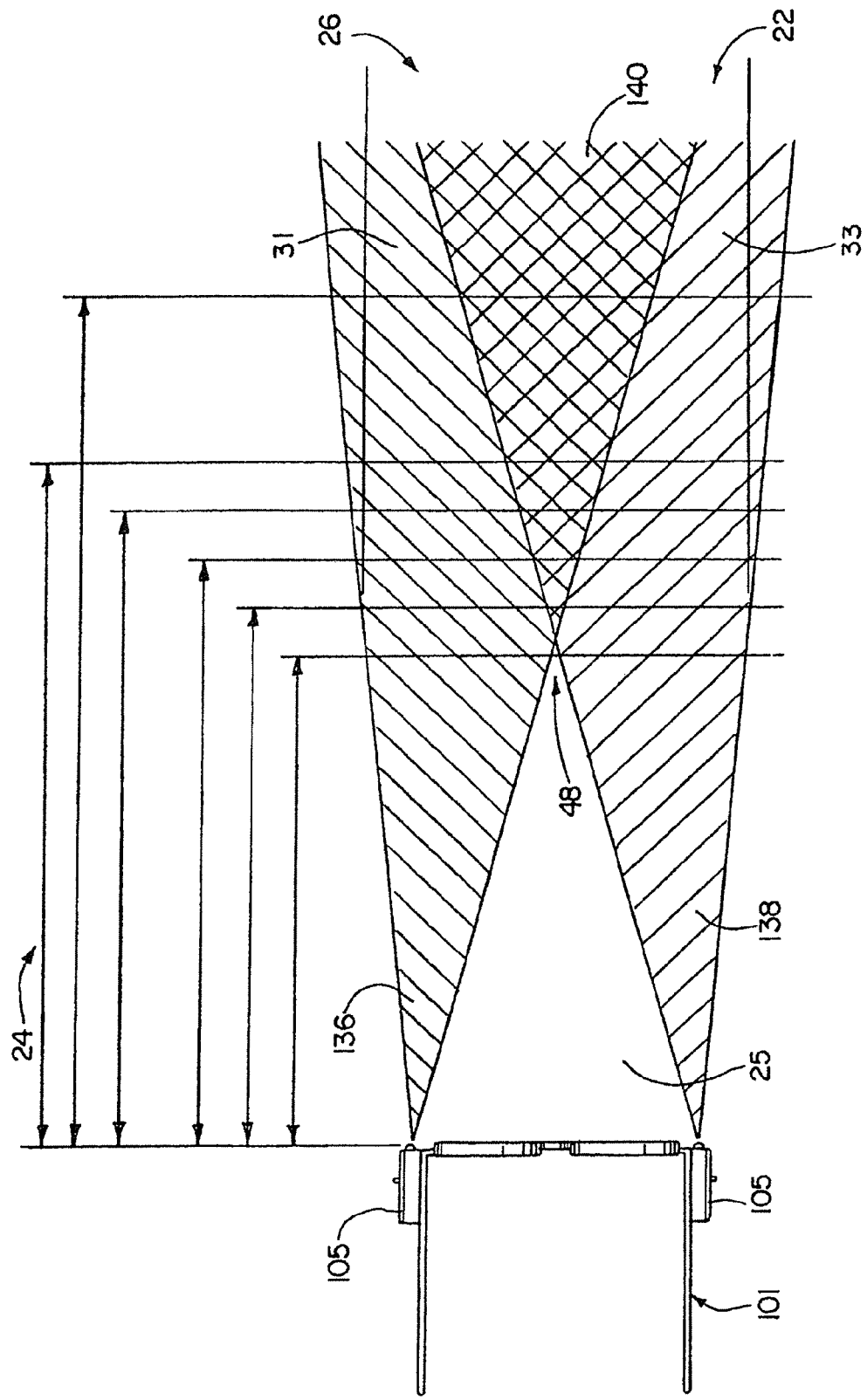
FIG. 9 is a diagrammatic view of the lighted glasses showing the respective inwardly directed cones of light produced by each of the light modules and the overlapping lighted area they create in the reading distance range.

With the reading glasses 5 on, the user will be able to read in dark or dimly lit areas via lights 16 that are on the glasses 5 attached by way of respective light mounts 18 therefor. The light mounts 18 fix the predetermined lighted areas 20 to be oriented so that they overlap and create an overlapping lighted area 22 which has double the amount of light and thus significantly increased brightness over that provided by a single one of the lights 16. As best shown in FIG. 9, the overlapping lighted area 22 is disposed in the predetermined reading distance range generally designated 24 by the direction afforded to the lights 16 via their light mounts 18. This range for a normal functioning eye or using an appropriate corrective lens for those requiring vision correction for reading ten or twelve point font with a sufficiently large or wide field of view will be approximately ten to eighteen inches in front of the lenses 12.

Figure 3:
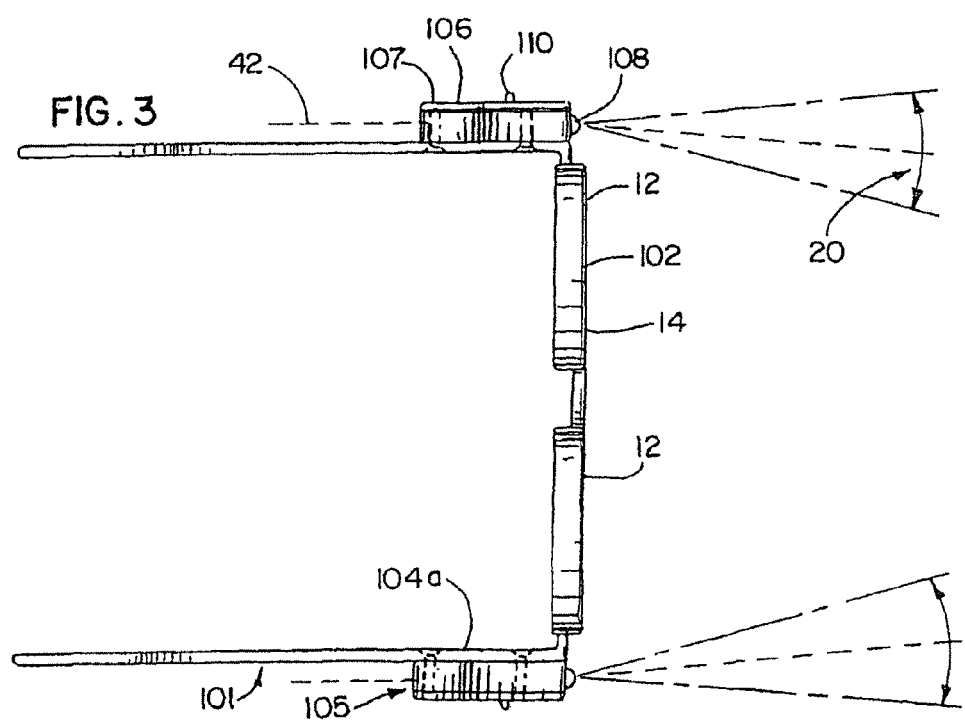
FIG. 3 is a plan view of the glasses of FIG. 2 showing a light switch shifted to activate the lights to generate cones of light emanating therefrom.

The lights 16 are preferably high intensity lights or LEDs 108 that form their lighted areas 20 as narrow light beams in the shape of respective cones 136 and 138 of light directed inwardly toward each other, as shown in FIGS. 3 and 9. In this manner, the point of intersection 48 will be closely adjacent or substantially coincident with the start of the reading distance range 24 and the overlapping area 22 will likewise take on a conical shape 140 and be maximized in size in the range 24. There is also a proximate conical area 25 right in front of the glasses 5 that does not receive light. However, this unlighted area 25 is of little consequence as it substantially falls before the start of the reading distance range 24.

By canting the light beams 136 and 138 inwardly, little light is wasted on areas that are outside the effective field of view, generally designated 26, of the glasses 5. Further, the conical overlap area 140 that receives double the amount of light increases in size with increasing distances from the lenses 12. By contrast, the peripheral areas 31 and 33 on either side of the double-lit overlap area 140 become smaller with increasing distance from the lenses 12. Since light dissipation can become an issue as distances increase from the light source, the increasing size of the double-lit area 22 in comparison to the decreasing size of the single-lit areas 31 and 33 provides a significant advantage in having a very well-lit reading area with an efficient use of the light generated by the LEDs 108 herein. Further, the fixed canting of the beams 136 and 138 allows a user to put on the glasses 5 and know that they will be able to begin reading even in dimly-lit areas by simply turning on the lights 16 without requiring that they be adjusted for focusing them on the material to be read.

The light mounts 18 are preferably compactly sized housings 109 for containing the high intensity LEDs 108 and at least one, and preferably two, small disc-shaped battery power supplies 116 in a space savings manner therein. The housings 109 can be constructed of two halves or cover members 106 and 107 each with mounting surfaces generally designated 30 and 32 configured to orient the LED dome lens 34 in a forward opening 36 of the housing 109 such that the light beam cones 136, 138 emanate in the desired inward direction. As best seen in FIGS. 7, 8 and 8A, the surfaces 30 and 32 can be formed integrally with their respective housing portions 106 and 107 such as on raised ribs 38 and 40. As shown, the surfaces 30 and 32 are each inclined to extend in the same direction relative to longitudinal axis 42 of the housing 109 such that they extend transversely and at an oblique angle thereto. In this manner, when the housing portions 106 and 107 are attached, the ribs 38 and 40 cooperate to capture the LED dome lens 34 in a canted orientation thereof relative to housing axis 42. Accordingly, with the LEDs 108 switched on, the axis 44 extending centrally through or bisecting the light beam cones 136 and 138 will generally extend parallel to the housing mounting surfaces 30 and 32 and at an oblique angle to the axis 42.

In the preferred and illustrated form, the eyeglasses 5 including temple arms 104 are constructed such that with the arms 104 opened, their forward end portions 104a will extend substantially normal to the general plane of the eyeglass lenses 12 and to any frame portions that may be included thereabout. Further, the housings 109 are constructed so that when attached flush to the arm forward end portion 104a as shown in FIG. 3, the housing axis 42 will extend parallel to the forward end portion 104a and straight forwardly from the glasses 5. With the preferred solid state material for the LEDs 108 as described hereinafter, they will generate a narrow light beam cone 136, 138 of twenty degrees. For this narrow cone 136, 138, the oblique inward cant angle 46 (FIG. 8A) is preferably approximately fifteen degrees so that the point 48 of intersection where the overlap lighted area 22 begins is centrally disposed between the lenses 12 and spaced forwardly therefrom approximately at the start of the reading distance range 24. This inward canting of the light beam cones 136 and 138 also minimizes the amount of light that is projected to lateral areas outside the field of view 26 forwardly of the glasses 5.

The LEDs 108 are preferably high-intensity white LEDs, such as manufactured by Chicago Miniature Lamp, Inc., of Hackensack, N.J., part number CMD333UWC-ND. Similar types of LEDs are available from a variety of manufacturers and such LEDs would also be acceptable for use in the light module 105. A particular advantage of using the described high-intensity LEDs is the ability of the LEDs to provide large amounts of bright light while consuming significantly less power than incandescent light sources and fiber optic devices. In particular, the LED 108 provides a typical 2300 mcd light output using only 20 mA of power. This allows for significantly extended battery life using inexpensive and lightweight batteries. A further advantage of this type of LED is the relatively narrow viewing angle of approximately 20 degrees. This allows the light output to be directed in a very precise manner, making it ideally suited for use in the present invention. Referring in particular to FIG. 3, it can be seen that the angle of the LED 108 causes the cone of light to be emitted at a specific angle so that the light is directed slightly inward toward the portion being read and thereby avoiding scattering of light outwards and particularly outside the field of view of the glasses 5.

Figure 4:
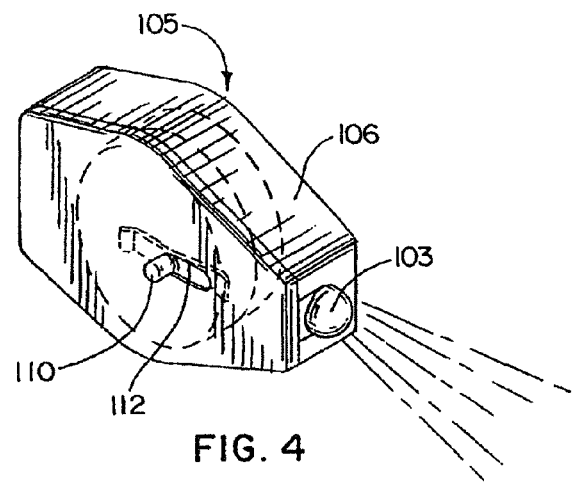
FIG. 4 is a perspective view of the light module showing the compact configuration of a housing of the module with a slot opening for the switch and a forward opening for the light in the form of an LED.

Turning now to FIG. 4, the light module 105 is shown in isolation from the eyeglasses. As can be seen in greater detail, the light module 105 houses a switch 114 having an actuator projecting portion 110. The projecting portion 110 is designed such that a user's thumb or finger can quickly and easily engage the projecting portion 110 to push the switch 114 for sliding in either one of two directions to turn the light module off and on. The elongated slot 112 is sized such that the switch 114 can be moved only a preset distance, thereby enabling the on and off functions to be accomplished with a minimum of motion. When the switch 114 is moved to the "on" position, a set of batteries 116 energize the LED 108. Similarly, when the switch 114 is moved to the "off" position, the connection between the batteries 116 and the LED 108 is broken and the LED 108 is turned off.

Figure 5:
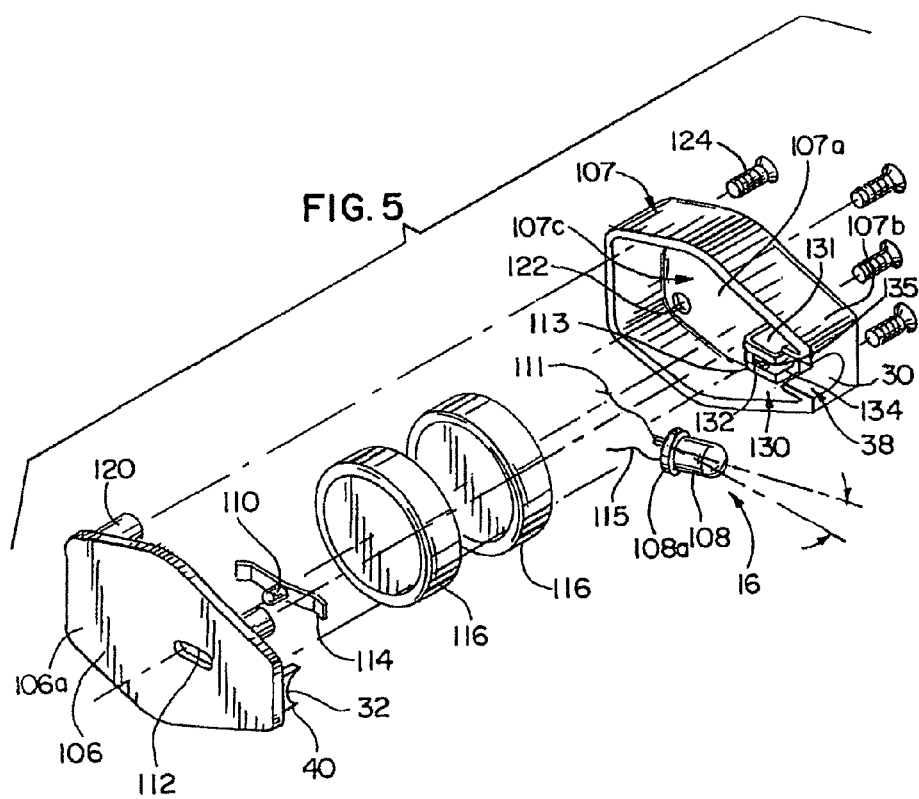
FIG. 5 is an exploded view of the light module of FIG. 4 showing a pair of coin cell batteries used to power the LED.

Referring to FIG. 5, an exploded perspective view of the light module 105 is shown. The light module 105 comprises a housing 109 (FIG. 11) that is preferably constructed of a lightweight material, such as plastic, to provide the greatest amount of comfort to the wearer, while still being a cost-effective product. The housing 109 includes a first cover member 106 and a second cover member 107. The second cover member 107 is formed with a main flat wall 107a from which upstanding walls 107b extend from the periphery thereof to form an interior space 107c in which the switch 114, the batteries 116 and the LED 108 are disposed. The fastening devices 124, which may be self tapping screws among others, are used to fasten the first cover member 106 as a lid onto the second cover member 107.

The first cover member 106 is formed with an elongated slot 112 cut out of the main flat wall 106a, several integral projecting bosses 120 that can be internally threaded for receiving fastening members or screws 124 and an integral LED positioning member or raised rib 40. The LED positioning member 40 extends toward the cover 107 and has a concave surface 32 that cooperates with concave curved surface 30 of the cover member 107 for capturing the LED dome lens 34 at the desired angle 46 to axis 42 (FIG. 8a). As described above, the elongated slot 112 is designed to receive the projecting portion 110 of a switch 114 such that the projecting portion 110 extends slightly outside the first cover member 106 and is accessible by a user's finger or thumb. The cover member 106 also is formed having a slot 119 (FIG. 8) to form a housing for the switch 114 when the light module is fully assembled.

The LED 108 includes anode 111 and cathode 115 leads that are used to energize the LED 108. In addition, the anode 111 and cathode 115 leads are physically configured to also enable the LED 108 to be securely held in position within the light module 105. The cathode 115 lead, which is generally the shorter of the two leads, is trimmed further to a size suitable for engaging an aperture 113 in a lead guide assembly or box shaped member 130. The trimmed cathode 115 lead is bent into a curved hook configuration to behave as a resilient spring clip when mounted into the light module 105; and the anode lead is left in its original form and engages a second aperture in the box shaped member 130, which enables the anode 111 lead to extend into the open portion of the second cover member 107, as further discussed below.

The second cover member 107 includes a LED positioning member or rib 38 having curved surface 30 formed thereon for cooperating with surface 32 to capture the LED dome lens 34, as previously described. A lead guide assembly 130 is disposed within cover member 107. The guide assembly 130 channels or guides the anode 111 lead and the cathode 115 lead into their respective appropriate positions for conducting and switching functions. The guide assembly 130 includes an extending sidewall 131 and an extending support structure 132. The support structure 132 includes a block 135 oriented between the aperture 113 and indent 134. When the LED 108 is placed into position in the guide assembly 130, the anode 111 lead is placed into the channel between the extending sidewall 131 and extending support structure 132. A large portion of the anode 111 lead extends beyond the sidewall 131 and into the cover member 107 opening. The cathode 115 lead, which is in a bent hook configuration, is placed into the support structure 132 such that the portion of the cathode that is connected to the LED 108 is situated in the indent 134 and the hooked portion engages the aperture 113 indent. The block 135 forces part of the cathode 115 lead to extend beyond the support structure 132 to enable contact between the batteries 116 and the cathode 115 via the switch 114.

The second cover member 107 also includes several apertures 122 for receiving the fastening devices 124. The fastening devices 124 are inserted into apertures 122 and engage the fastening receiving members 120 of cover member 106. The apertures 122 in the second cover member 107 are preferably countersunk such that the heads of the fastening devices 124 sit flush with the surface of the second cover member 107. Furthermore, by providing a standard Phillips or slot headed fastening device, a user is able to gain access to the interior of the light module using a simply, commonly found household screwdriver. Once inside, the user self-services the light module 105 and, in particular, replaces the batteries 116 when they are exhausted.

The batteries 116, because of the low power consumption of the high-intensity LEDs 108, may be any commonly found small form factor batteries, such as three volt coin cells manufactured by Panasonic Corporation of Japan, part no. P189D. To this end, the disc shaped batteries preferably have a diameter of slightly greater than three-fourths of an inch and a width of approximately one-eighth of an inch so that two batteries 116 can be stacked in a compact fashion. Accordingly, with the small LED 108 and the small and thin batteries 116, the housings 109 can be constructed in a very compact fashion. By way of example and not limitation, the main housing walls 106a and 107a have a maximum width of less than approximately one-inch. Since neither the batteries 116 nor the LED 108 is particularly long, and the stroke of the switch 110 in minimized as previously described, the length of the housing 109 can be minimized to be on the order of approximately one and one-half inches. Finally, since the batteries 116 are so thin, the depth of the housing 109 can be sized to be slightly greater than the thickness of the two stacked disc batteries 116 or less than approximately one-half inch.

When assembled, the batteries 116 make contact with the anode or elongated portion 111 of the LED 108. The batteries 116 are stacked together such that the negative terminal of the first battery is an electrical contact with the positive terminal of the second battery. The positive terminal of the first battery 116 is then placed in electrical contact with the elongated portion 111 of the LED 108. The switch 114 which is constructed of an electrically conductive lightweight metal strip rests solely on the negative terminal of the second battery when the light module is not producing light, resulting in an open circuit. When the switch 114 is placed in its on position, an electrical connection is created between the negative terminal of the battery 116 and the depending hooked portion 115 of the LED 108. Thus the circuit from the positive terminal of the battery 116 to the LED 108 is completed using the switch 114, and the LED 108 illuminates. The projecting portion 110 may be integrally formed as part of the metal strip or may be a plastic or metal projection that is fastened at an appropriate position in the body of the switch 114. The body of the switch 114 is constructed such that the metal strip includes one or more inclines formed by bends in the metal strip of the switch. The inclines are sized to cause the switch 114 to fit relatively tightly between the battery and the housing much like a spring, thereby enabling the switch to maintain its on or off position into which it has been placed.

Referring to FIGS. 8 and 8A, the light module is shown in its assembled form. The LED positioning member 40 of the cover member 106 presses against the body of the LED 108 and pushed the LED 108 into a canted position within the housing 109. A particular advantage in such a configuration is that the LED is able to project light at a precise pre-determined angle. Referring in particular to FIG. 8A, it can be clearly seen that the base 108a of the LED 108 helps to hold the LED 108 in place within the housing 109. Furthermore, it also clearly can be seen that the LED positioning member 40 is angled to a degree such that the top of the LED 108 is pushed against the second cover member 107 and particularly the positioning rib 38 thereof.

Turning now to FIG. 9, the eyeglasses 101 having the light modules 105 mounted thereon are shown in operation. The canted positioning of the LEDs 108 (FIG. 8A) in each of the light modules 105 cooperate to create an overlapping zone 140 of their respective cones of light 136, 138 in the desired reading range. In particular, because of the twenty degree cones of light 136, 138 of the LEDs 108, and their precise cant within the housing 109, the overlap area 140 occurs within a range of distances that is ideally suited for reading after the use of corrective lenses in the eyeglasses for those in need of vision correction. As a result, the incidence of stray light is reduced and the amount of light illuminating the reading surface is maximized, as previously described. The eyeglasses themselves may be of any configuration. For example, the lenses of the eyeglasses mayor may not have frames surrounding the exterior edges of the lenses. Furthermore, the eyeglasses may have bridges for interconnecting the inner portions of the lenses for interconnecting the inner portions of the lens frames, depending on whether the eyeglasses have frames.

Figure 10:
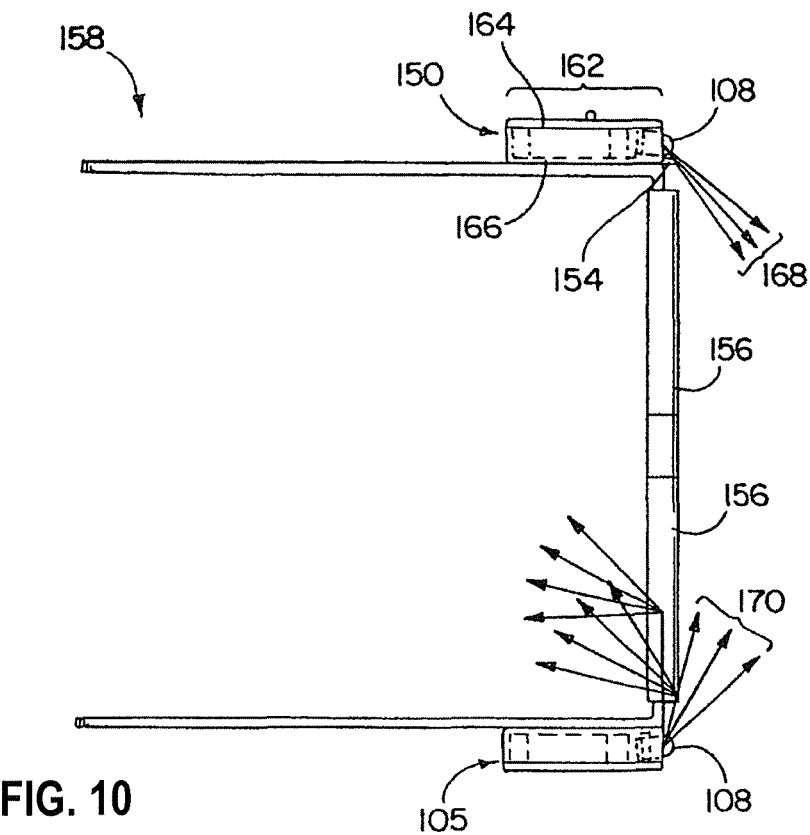
FIG. 10 is a plan view of the lighting modules modified so that each include a blinder extension integral with the housing and disposed between the LEDs and the adjacent lenses.
Figure 11:
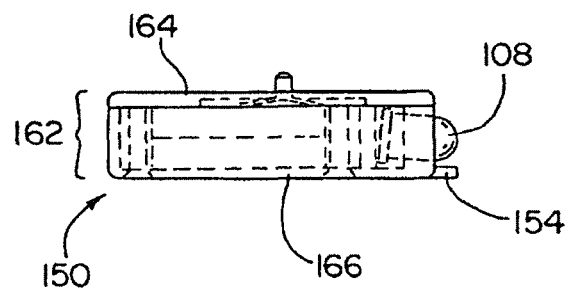
FIG. 11 is an enlarged elevational view of the lighting module of FIG. 10.

Referring now to FIGS. 10 and 11, a light module is shown having an integrally formed blinder extension 154 to eliminate glare. An advantage of such a light module is that reducing glare also reduces eye-fatigue that a wearer may suffer when wearing eyeglasses with the light modules for extended periods of use. Although both types of light modules work equally well, individuals with sensitive eyes may prefer the light module with the blinder extensions. By way of example only, and to illustrate the difference between the two light modules, eyeglasses are shown mounted with a first light module 150 with an integrally formed blinder extension 154 on one temple area of the eyeglasses and a second light module 105 (as generally described above) mounted on the other temple area of the eyeglasses.

Lighted eyeglasses having the light module 105, mounted in the manner described above may, in certain instances, create glare that is perceivable by the wearer. As shown, stray or incident light rays 170 that are emitted by the LED 108 may project towards the lens 156 of the pair of eyeglasses 158. The rays 170 are then reflected or refracted by the lenses 156 into the eyes of the wearer. In contrast, the glare reducing light module 150 includes an integral projecting portion or blinder extension 154 for reducing potential glare that may be generated as a result of the light 168 emitted by the LED 108 as it is reflected or refracted off the lenses 156 in the glasses 158. The light module 150 is comprised of a housing 162 that includes a first cover member 164 and a second cover member 166. The second cover member 166 includes the blinder extension 154, which is situated between the LED dome and the lens 156 when the light module is mounted to eyeglasses. The blinder extension 154 is configured such that it extends outwards in the direction of the LED 108 and is optimally sized such that the blinder extension 154 blocks the incident rays of light without distracting the wearer or interfering with the light 168 projected for illuminating a reading surface. In this regard, it is manifest that the blinder extension 154 is of a light blocking material, such as an opaque material.

In general and as further described below with regard to FIGS. 12-19, illuminated eyewear, which may or may not include a lens or lenses 821 attached thereto, is provided to provide lighting forwardly of the wearer. The illuminated eyewear 810 can be configured to have a typical eyeglass frame 811 with a plurality of generally rigid frame members including a pair of spaced temple arm members 812 and a front cross-frame member 814 extending laterally between the temple arm members 812. As illustrated, the temple arm members 812 are pivotally connected to the cross-member 814 via hinges 830 at the juncture between laterally opposite end portions 816 of the cross-frame member 814 and front end portions 844 of the temple arm members 812.

Other constructions for the frame 811 of the lighted eyewear 810 are also contemplated including those where the cross-frame member 814 is modified to include several components or parts or where these parts are substantially reduced or even eliminated such as by only including an intermediate bridge portion or member 820 connected at either end thereof to lenses 821. The cross-member 814 can also have the laterally outer, front frame end portions 816 connected only to the laterally outward portions of the lenses 821 with these outer frame portions 816 being separate from the intermediate bridge portion 820 so that the cross-frame member 814 includes multiple parts. Alternatively, only a single lens 821 may be provided extending between and pivotally connected to the forward end portions 844 of the temple arm members 812 with the bridge portion 820 integrated into the lens 821 so that lens 821 constitutes part of the eyeglass frame. The lenses 821 themselves may be either refractive to provide vision correction or non-refractive to only provide a transparent shield for protection, as with safety glasses. Manifestly, the lens or lenses 821 need not be provided as the eyeglass frame could be used only to provide for hands-free lighting. Herein, the term front support contemplates all these and other constructions for the single or multiple part cross-frame member with or without lenses where the front support is used to support the front portion of the lighted eyeglasses herein on a person wearing the lighted eyeglasses.

The frame 811 of the illuminated eyeglasses 810 could also be one integral piece, with or without lens or lenses 821, with the hinges or hinge connections 830 between the temple arm and cross-frame or front support portions being in the form of living hinges. In this regard, the hinges would be portions of the frame 811 that are resiliently flexible such as by being reduced in their cross-sectional thickness over adjacent frame portions to allow the temple arm portions 812 to be resiliently folded to a substantially closed position adjacent the front support to provide a compact storage configuration for fitting in an eyeglass case for example, with the temple arm portions 812 resiliently returning to their use configuration extending generally rearwardly from the front support when the eyeglasses 810 are removed from the storage case.

The illuminated eyewear 810 preferably has at least a pair of light sources 818 mounted thereto to provide lighting forwardly of a wearer. The light sources 818 are preferably light emitting diodes (LEDs), but other suitable electroluminescent lamps, suitable incandescent lamps, gas discharge lamps, high-intensity discharge lamps, or any other suitable light source, such as a laser diode, can be utilized.

Referring to FIGS. 12-19, one form of exemplary illuminated eyewear 810 is illustrated in more detail. As mentioned above, the front-support or cross-frame member 814 includes the intermediate bridge portion 820 intermediate of the end portions 816. The bridge portion 820 is configured to allow the cross-frame member 814 to rest on and be supported by the bridge of a wearer's nose. The bridge portion 820 includes downwardly and rearwardly extending side rests 822 configured to engage the sides of the wearer's nose. As illustrated, the bridge portion 820 is a portion of the illustrated integral, one-piece cross-frame member 814 and has a truncated generally triangular shape, however, the bridge portion 820 could alternatively include other configurations, such as employing adjustable pads attached to the cross-frame member 814 configured to contact and rest upon the sides of the wearer's nose instead of the side rests 822 and frame configuration.

In the illustrated form, the cross-frame member 814 of the illuminated eyewear 810 includes an upper frame portion 824 and a lower frame portion 826 extending from both sides of the bridge portion 20 to the end portions 16 thereof. However, the front support may also include a frameless construction or have only either the upper frame portion 824 or the lower frame portion 826. In another approach, the front support 814 consists of the bridge portion 820 attached directly to lenses, which then can attach directly to the temple arm members 812 or can have an intermediate frame part or portion pivotally coupling the lenses to the temple arm members 812. Other configurations for the front support could also be employed, as has been previously discussed.

Figure 12:
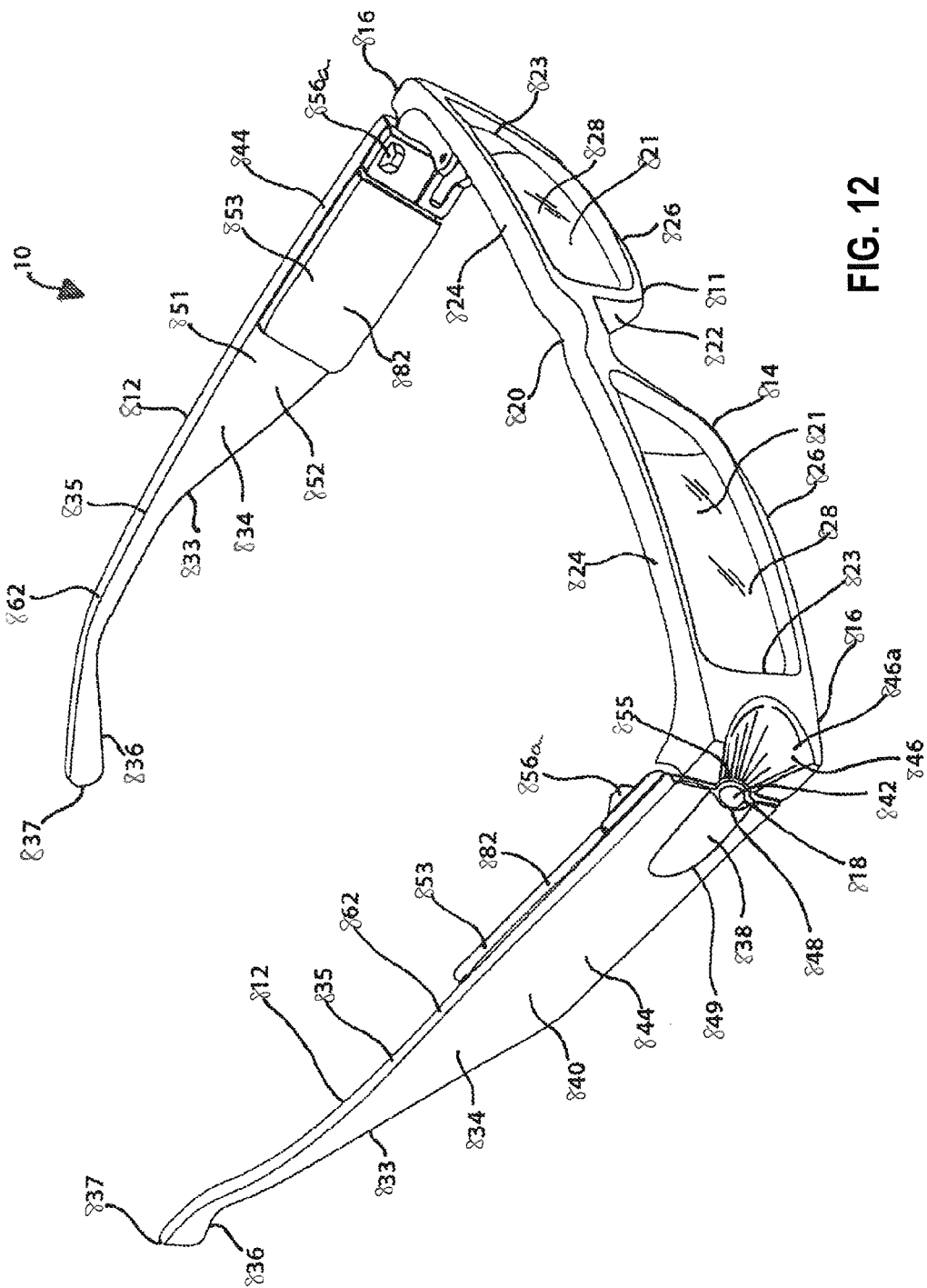
FIG. 12 is a perspective view of illuminated eyewear showing temple arm members in a pivoted open configuration relative to a cross-frame member with an LED light source on each temple arm disposed adjacent respective blinder portions of the cross-frame member.
Figure 15:
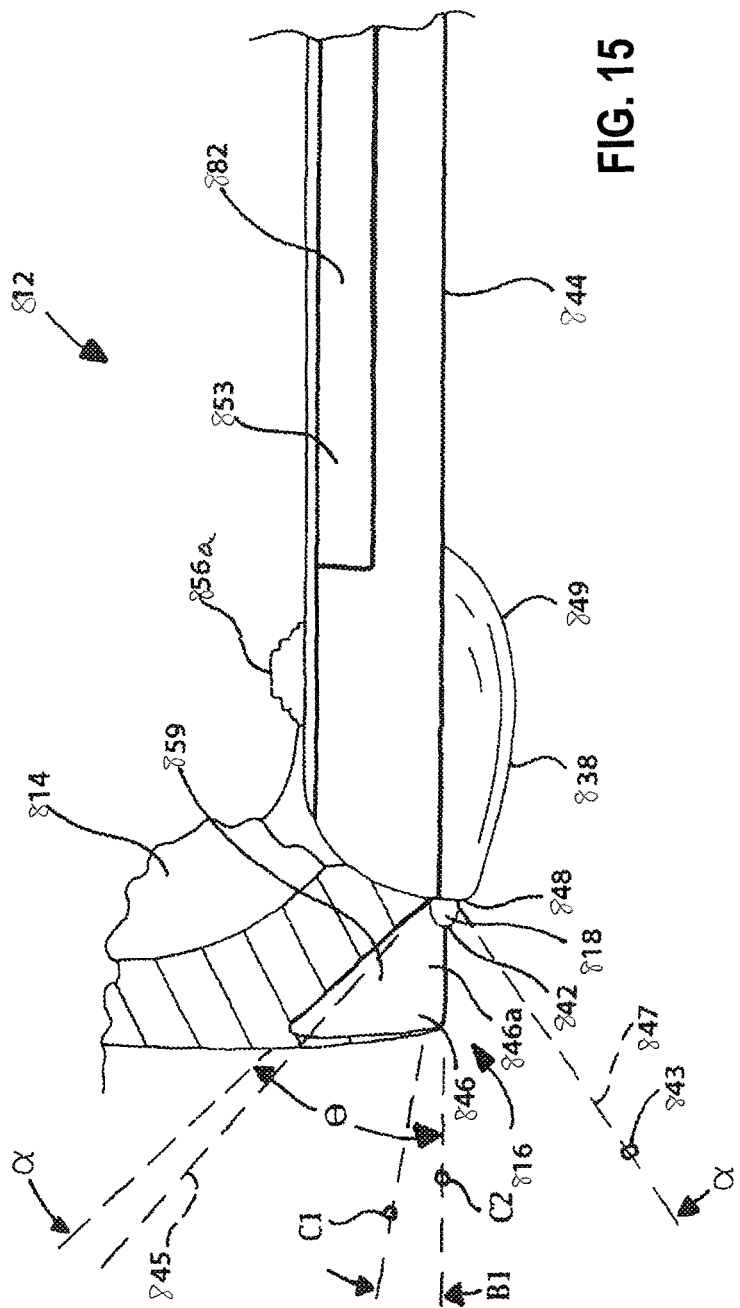
FIG. 15 is an enlarged fragmentary plan view partially in section showing an inclined surface of the blinder portion having an inclination substantially aligned with that of the inner edge of the light cone.

The end portions 816 can have a generally arcuate configuration to extend laterally from the laterally outer portions of the lenses 823 and rearwardly to be pivotably connected to the temple arm members 812, as can be seen in FIGS. 12 and 15. As illustrated, the upper frame member portion 824 and the lower frame member portion 826 form lens openings 828 in which the lenses 821 are fit. The lens openings 828 are configured to support a variety of eyeglass lens types. For example, the lens openings 828 may be used to support lenses used for safety glasses, sunglasses, prescription glasses, other protective eyewear, or any suitable combination thereof. Alternatively, the lens openings 828 can be left empty and/or the cross-frame member 814 can be formed without the lower frame member portion 826.

Figure 14:
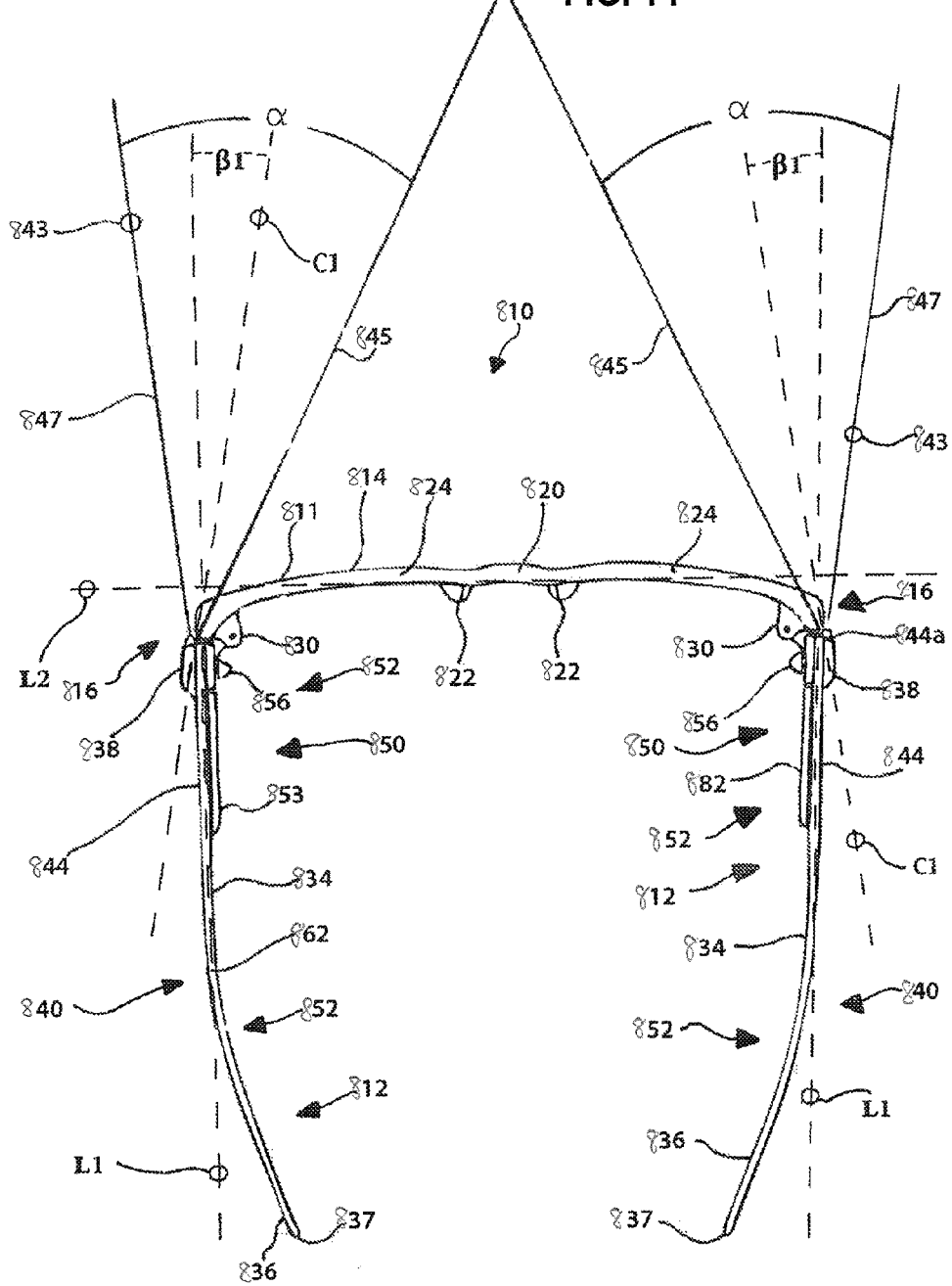
FIG. 14 is a plan view of the illuminated eyewear showing the LED light sources being canted laterally inward so that the axes of light cones projected therefrom are canted laterally inward toward each other.

The forward end portions 844 of the temple arm members 812 are pivotally connected to the end portions 816 of the cross-frame member 814 by the hinges 830 to form pivot connections therebetween to allow the temple arm members 812 to pivot relative thereto. When pivoted to an open or use configuration as shown in FIG. 12, the temple arm members 812 extend generally rearwardly from the cross-frame member 814 along fore-and-aft axes L1 that are generally orthogonal to a lateral axis L2 along which the cross-frame member 814 generally extends. The temple arm members 812 are also configured to pivot or shift to a collapsed, closed, or storage configuration with each temple arm member 812 generally extending laterally along the L2 axis adjacent to the cross-frame member 814. As can be seen in FIG. 14, both the temple arm members 812 and the cross-frame member 814 have curvatures such that they do not extend linearly along their respective axes L1 and L2 but rather more generally thereal-ong, as described above.

As discussed above, the temple arm members 812 are pivotally connected to the cross-member 814 via the hinges 830 at the juncture between the laterally opposite end portions 816 of the cross-frame member 814 and the forward end portions 844 of the temple arm members 812. In the illustrated form, the forward end portions 844 of the temple arm members 812 are thicker in the lateral direction than the remainder of the temple arm members 812 extending rearwardly therefrom. The forward end portions 844 of each of the temple arm members 812 are enlarged in two directions that are orthogonal to each other and orthogonal to the longitudinal axis L1 of the temple arm members 812. As shown, the temple arm members 812 are relatively thin even with the thicker forward end portions 844 which are approximately twice as thick as the remainder of the temple arms. As discussed hereinafter, the thicker forward portions 844 are configured to house electrical components that are operable to selectively provide electrical power to the LEDs 818.

More particularly, the temple arm members 812 extend rearwardly from the forward portion 844 to an intermediate portion 834 configured to rest on and be supported by the ears of the wearer. The intermediate portion 834 has a bottom edge 833 that tapers up toward the top edge 835 of the temple arm members 812 to reduce the height thereof for properly fitting on the ears of the wearer. The temple arm members 812 terminate with a distal portion 836 that extends laterally inwardly and downwardly as it extends rearwardly from the intermediate portion 834 to rearward ends 837 of the temple arm members 812. So configured, the temple arm members 812 generally follow the contour of the wearer's head from adjacent the eyes to a position behind the ears. Alternatively, the distal portions 836 need not extend downwardly and the intermediate portion 834 of the temple arm members 812 need not rest on a wearer's ears instead gripping on the side of the wearer's head as is known.

As discussed above, the intermediate portion 834 and the distal portion 836 are thinner in the lateral direction than the forward portion 844 of the temple arm members 812. However, even with the enlarged forward portion 844, the thickness of the temple arm members 812 are very thin such that they have a generally flat configuration akin to temple arm members commonly provided with traditional non-lighted eyeglasses. By way of example and not limitation, the lateral thickness of the intermediate and distal portions of the temple arm members 812 can be approximately 3 mm, and the lateral thickness of the forward portion 844 can be approximately 5 mm. Configurations other than generally flat could also be employed for the temple arm members 812 such as by including both flat and curved portions or only curved portions of the temple arm members 812. For instance, the temple arm members 812 could also have a small diameter, cylindrical configuration.

Figure 16:
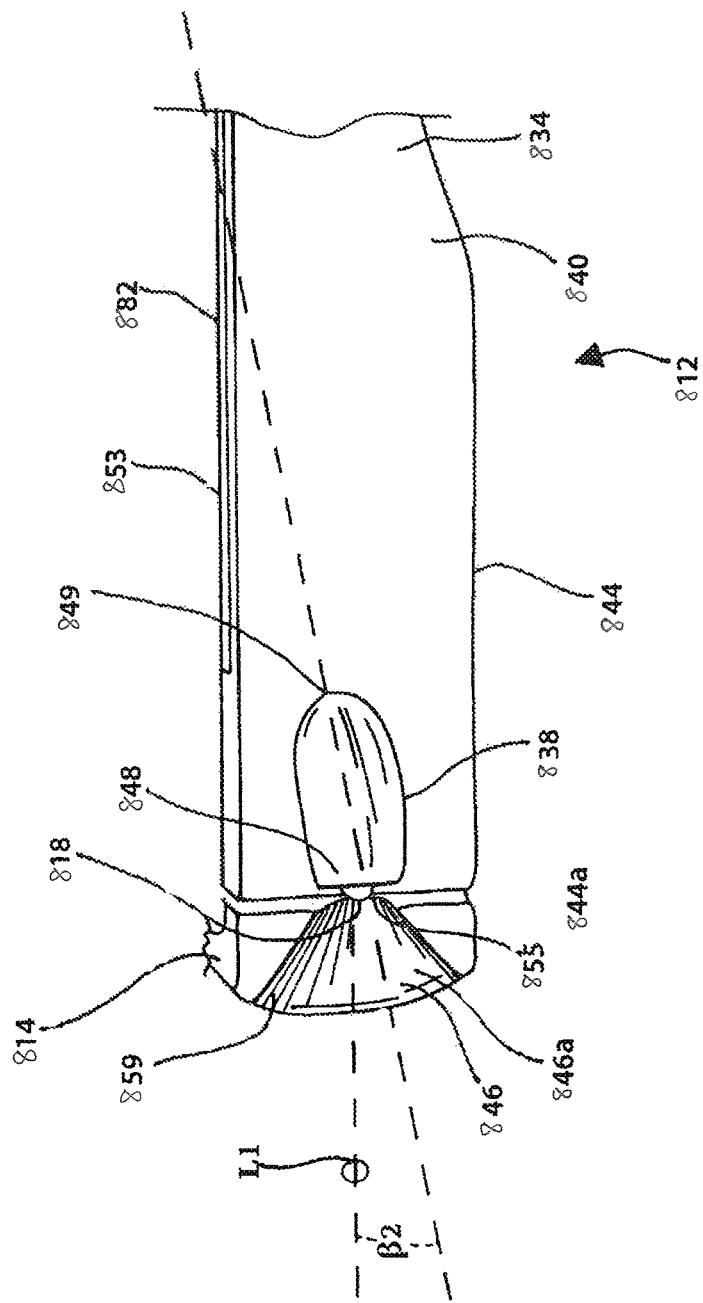
FIG. 16 is an elevational view showing one of the temple arm members including an integral tubular LED holder that directs the light cone downwardly.

The light sources 818, which may be small LEDs, are preferably mounted to the forward end portions 844 of the temple arm members 812. By one approach, each light source 818 is mounted at least partially within a projection or tubular portion 838 extending slightly outwardly from outer surface portion 840 of each temple arm member 812. In this manner, the forward end portion 844 acts as the light mount for the light source or LED 818 received therein. The outer surface portion 840 preferably has a flat configuration but for the tubular portion 838 projecting therefrom, with the tubular portion 838 providing a partially outward positioning of the light source 818 relative to the flat outer surface 840 of the temple arm to position the light for forward illumination. At the same time, the projecting tubular portion 838 has a small radius of curvature such as on the order of approximately 2 mm that substantially conforms to that of the cylindrical portion of lens 842 of the LED 18, which is effective to keep the size and weight increase associated with the lighted eyeglasses to a minimum. Preferably, the tubular portions 838 are formed at the forward end portions 844 of the temple arm members 812 in the middle region along the outer surface portion 840 between the upper and lower edges 862 and 864 of the temple arm members 812, as best seen in FIG. 16.

A forward lens 842 of the LED light source 818 is generally aligned with or extends slightly forwardly of the forwardmost end 844a of each of the temple arm members 812. In addition, the LED element that generates light similarly is generally aligned with the temple arm member forwardmost end 844a. By this positioning, no portion of the temple arm member 812 interferes with the light cone emitted by the LED 818. Positioning the LED element and lens 842 even with or forwardly of the forwardmost end 844a of the temple arm member 812, however, still can undesirably generate glare from incident light outside the light cone of the LED 818 since the LEDs 818 are still recessed back from the forward portions of the cross-frame member 814, and in particular the lenses 821 thereof. For instance, such incident light that reaches the lenses 821 may be refracted or reflected into the wearer's eyes or the incident light may simply be an annoyance and distraction to the wearer by being within the wearer's peripheral vision. In the illustrated form, the illuminated eyewear 810 minimizes these issues by positioning the LEDs 818 adjacent the outer surface portions 840 of the temple arm members 812, as discussed above.

As is understood, the LEDs 818 emit a conical beam of light. In this regard, the light cone 843 generally has the illustrated laterally outward opposite side edges 845, 847 that taper away from each other from the vertex or the LED element in the LED lens 842 so that the cone 843 has a predetermined angle or degree of spread a between the opposite edges thereof. For example, this light cone angle α may be between about 20 degrees and about 40 degrees. A light cone center axis or centerline C1 extending forwardly from the LED element divides the light cone 843 in half with equal angles between the axis C1 and each of the illustrated, opposite light cone edges 845, 847. In order to orient the light sources 818 to emit such cones 843 of light to maximize the amount of light in the viewing or reading area forwardly of a wearer (e.g., preferably about 6 to 24 inches in front of the wearer), the LEDs 818 can be canted laterally inwardly toward each other as shown in FIG. 15 and downwardly relative to the temple arm members 812 and the fore-and-aft temple axes L1, as shown in FIG. 16. Referencing FIGS. 14 and 15, the LEDs 18, and more particularly the light cones 843 emitted therefrom, are canted laterally inward so that the center axis C1 of the cones extend transversely to the temple axis L1, at an angle β1 from the temple axis L1 so that the light cones intersect closer forwardly of the cross-frame member 814 than if the cone axes C1 and fore-and-aft temple axes L1 were substantially coincident.

More particularly, the tubular portions 838 are configured so that they taper in the forward direction toward the outer surface portion 840 of the temple arm members 812 so that the LEDs 818 mounted therein have the desired inward cant, as shown in FIG. 15. With the LEDs 818 canted inwardly, the inner edges 845 of the light cones 843 will intersect each other at the beginning of the reading or viewing distance of the wearer, such as 6 inches forwardly of the lenses 821, without requiring LEDs having wider light cones. As shown in FIG. 16, the tubular LED mounting portions 838 can also be configured to extend forwardly and slightly downwardly with the forward portion 848 slightly lower than the rearward portion 849 so that the LEDs 818 mounted therein are also oriented to extend forwardly and slightly downwardly with the central axis C1 of the light cones 843 being canted downwardly at an angle β2 to the temple fore-and-aft axis L1. In this manner, the light cones 843 emitted from the LEDs 818 are also canted in a downward direction relative to the temple arm members 812 and the cross-frame member 814.

As previously mentioned and as can be seen in FIG. 14, the LEDs 818 are disposed adjacent to the end portions 816 of the cross-frame member 814 so as to be recessed rearwardly with respect to the lenses 821 that also curve slightly forwardly since they are held by the cross-frame member 814 that has a slight forward curvature. As a result of this arrangement and as previously discussed, incident light and glare caused thereby can be a problem. To avoid this, the eyeglass frame 811 and preferably the front support thereof can include blinder portions 846 laterally inward from the adjacent light sources or LEDs 818 so that the blinder portions 846 are arranged and configured to keep incident light from reaching the eyes of the eyeglass wearer. More specifically, the blinder portions 846 each include a blinder surface 846a that extends forwardly alongside the LEDs 818 transversely to the lateral axis L2. The blinder surfaces 846a can extend orthogonal to the lateral axis L2. However, this configuration of the blinder surfaces 846a can interfere with the light cones 843 emitted by the LEDs 818. In other words, with adjacent blinder surfaces 846*a* that extend orthogonal to axis L2 and parallel to the fore-and aft axes L1, the inner edges 845 of the light cones 843 can intersect the blinder surfaces 846*a*.

Accordingly, in the illustrated and preferred form, the lighted eyeglasses 810 avoid substantial interference with the light cones 843 by having the blinder portion 846 configured so that the blinder surface 846*a* is inclined to extend at a laterally inward cant obliquely relative to the lateral axis L2, as will be described further hereinafter. In this manner, the blinder surfaces 846*a* extend in the same general direction as the inner edge 845 of the corresponding light cone 843 so as to minimize interference therewith thus maximizing the amount of light from the LEDs 818 that is utilized to illuminate the viewing area for the wearer of the eyeglasses 810.

Figure 13:
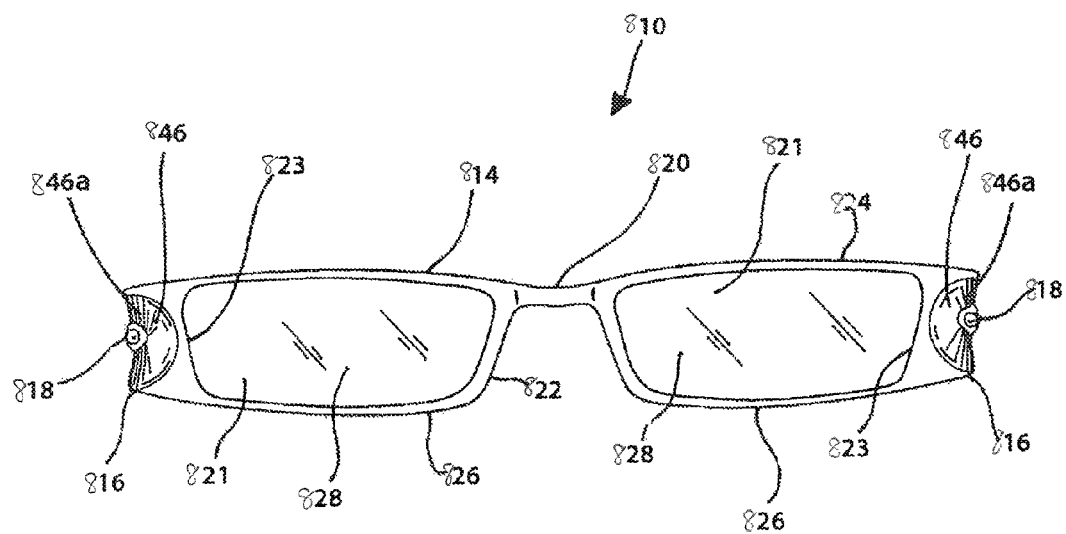
FIG. 13 is a front elevational view of the illuminated eyewear showing both of the LED light sources adjacent corresponding blinder portions of the front, cross-frame member.

More particularly, the blinder portions 846 are preferably formed in the outer end portions 816 of the cross-frame member 814 and each have a blinder surface 846*a* with a generally semi-frustoconical configuration. In this regard, the semi-frustoconical blinder surfaces 846*a* can be constructed from a reference right cone with the surfaces 846*a* truncated so that the vertex of the reference cone is generally positioned where the corresponding LEDs 818 are located when the temple arm members 812 are pivoted to their open position. The truncated reference cone along which the blinder surfaces 846*a* each extend is generally divided in half so that the blinder surfaces 846*a* open laterally outward and have a bottom notch opening 855 sized to fit the LEDs 818, and specifically the laterally inner half of the LED lenses 842, therein when the temple arms 812 are pivoted open, as seen in FIGS. 13 and 15. In this manner, each of the LEDs 818 is substantially oriented at the vertex of the reference cones of its adjacent blinder portion 846 when the lighted eyeglasses 810 are in their use configuration. As is apparent from the above, the blinder portions 846 are positioned adjacent to the LEDs 818 and generally laterally inward from the LEDs 818 and extend at a laterally inward incline generally forwardly from the LEDs 818. So configured, when the temple arm members 812 are pivoted to the use configuration, the lenses 842 of the LEDs 818 are positioned laterally adjacent to the blinder portions 846.

As illustrated in FIG. 15, the reference cone along which the blinder portion surfaces 846*a* extend has a conical angle or opening angle θ that is substantially equal to or slightly larger than the light cone a emitted by the light source 818. Additionally, the blinder portion surface 846*a* can be canted in the same manner as the light cones 843 from LEDs 818 so that the surfaces 846*a* generally extend along the laterally inner edge 845 of the light cones 843 or preferably tapering slightly away therefrom so as to generally avoid interfering with or intersecting the light cones 843. To this end, the central axis C2 of each of the reference cones along which the blinder surfaces 846*a* extend is substantially coincident with the canted central axis C1 of the light cones of the LEDs 818. In this manner, the amount of light from the preferred canted LEDs 818 that reaches the viewing area is maximized while incidental light outside the light cones is blocked from reaching the eyes of the wearer of the lighted eyeglasses 810. As is apparent, to perform such a light blocking function, it will be appreciated that the material of the blinder portion 846 is of a light blocking material, such as an opaque material.

By another approach, the blinder portions 846 could be incorporated in the temple arm members 812 rather than in the end portions 816 of the cross-frame member 814. In this form, the temple arm members 812 would include both the light sources 818 and the blinder portions 846. Accordingly, in this approach, the temple arm members 812, and specifically the blinder portions 846 thereof, would be pivotably connected to the cross-frame member 814.

As described earlier, the LEDs 818 can be mounted to the temple arm members 812, and specifically partially within the tubular portions 838, to project their light cones at the angle β2 downward with respect to the longitudinal axis L1 of the temple arm members 812. By way of example and not limitation, the angle β2 can be in the range of about 2 degrees to about 10 degrees and preferably about 3 degrees to about 5 degrees from the longitudinal axis L1 of the temple arm members 812. In addition, the LEDs 818 can also be housed within the temple arm members 812, and specifically the tubular portions 838, to project their light cones 843 at the laterally inwardly canted angle β1 relative to the longitudinal axes L1 which can be in the range of about 2 degrees to about 10 degrees and preferably about 3 degrees to about 5 degrees. Accordingly, in the illustrated and preferred form, the LEDs 818 are canted both inwardly and downwardly relative to the L1 axis. As such, in the illustrated form, the tubular members 838 are also inclined or canted relative to the temple arm members 812 and the flat temple outer surface portion 840, as previously described. For instance, distal end portion 849 of the tubular portion 838 extends further from the outer surface portion 840 of the temple arm member 812 with the tubular portion 838 generally being inclined toward the outer surface portion 840 as the tubular portion 838 extends forwardly along the temple arm member 812 to the forward end 848 thereof. This configuration generates the inwardly directed cant β1 of the light source 818 while also positioning the lens 842 of the LED 818 adjacent the blinder portions 846 when the temple arm members 812 are in the use configuration. The LEDs 818, however, can be canted inward or downward at different angles to direct the light emitted by the LEDs 818 to other areas forwardly of the wearer. If desired, the LEDs 818 may also be adjustable so that the cant of the LEDs 818 can be user selected.

Similarly, the blinder portions 846 can be configured to substantially match the orientation of the light cones 843 emitted from the LEDs 818 with the lighted eyeglasses 810 in the use configuration. For this purpose and as previously described, the central axis C2 of the reference cones along which the semi-frustoconical blinder surfaces 846*a* extend may also extend at a laterally inward and downward cant similar to the cants β1 and β2 of the light cones 843 of the LEDs 818. For example and as illustrated in FIG. 15, central axes C2 of the blinder portions 846 is canted approximately the same degree inwardly and/or downwardly as the central axes C1 of the light cones 843 of the LEDs 818 relative to the temple arm axes L1 with the temple arm members 812 pivoted to their open configuration. In addition, the incline or cant of the laterally innermost edge 859 of the semi-frustoconical blinder surface 846*a* of the blinder portion 846 is preferably the same as or slightly greater than the corresponding laterally innermost edge of the cone of light emitted from the LED 818; thus, the blinder portions 846 do not interfere with, constrict, or alter the shape of the light cones emitted by the LEDs 818. By one approach, the conical or opening angle θ of the reference cones for the blinder portions 846 is about 2 degrees to about 5 degrees wider than the corresponding angle α of the LED light cones. For example, if the cone of light has a conical angle of about 10 degrees to about 40 degrees total or about 5 degrees to about 20 degrees on either side of the light source centerline C1, then the conical angle θ for the blinder surface 846*a* can range from about 10 degrees to about 15 degrees on either side of the axis C2 for a 20 degree light cone up to about 20 degrees to about 25 degrees on either side of the axis C2 for a 40 degree light cone.

As shown and described above, only the tubular portion 838 projects laterally beyond the outer surface portion 840 of the temple arm members 812. Accordingly, there are no electrical components, access openings, coverings, or the like, mounted to or formed in the outer surface portion 840 of the temple arm members 812. Similarly, the cross-frame member 814 has a substantially typical and ordinary eyeglass appearance, except for the inclusion of the blinder portions 846. This configuration provides the illuminated eyewear 810 with visible surfaces that are similar to non-lighted eyeglasses and frames thereof, which creates a pleasing aesthetic, while also keeping the light sources 818 from shining into the eyes of the wearer or being in the peripheral vision of the wearer.

Figure 17:
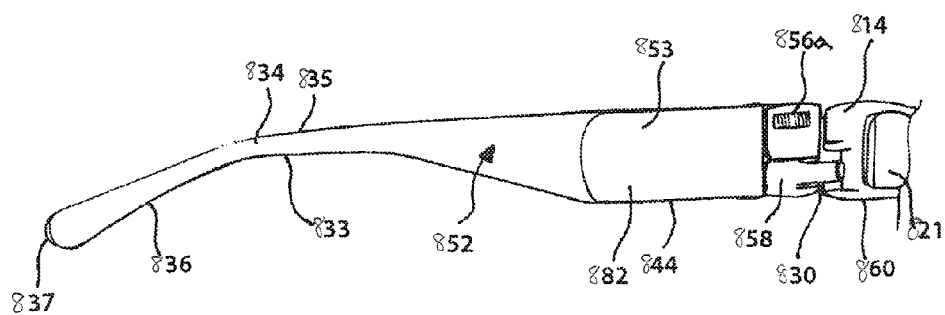
FIG. 17 is an elevated view of one of the temple arm members showing a battery compartment cover and a light switch actuator adjacent thereto.
Figure 18:
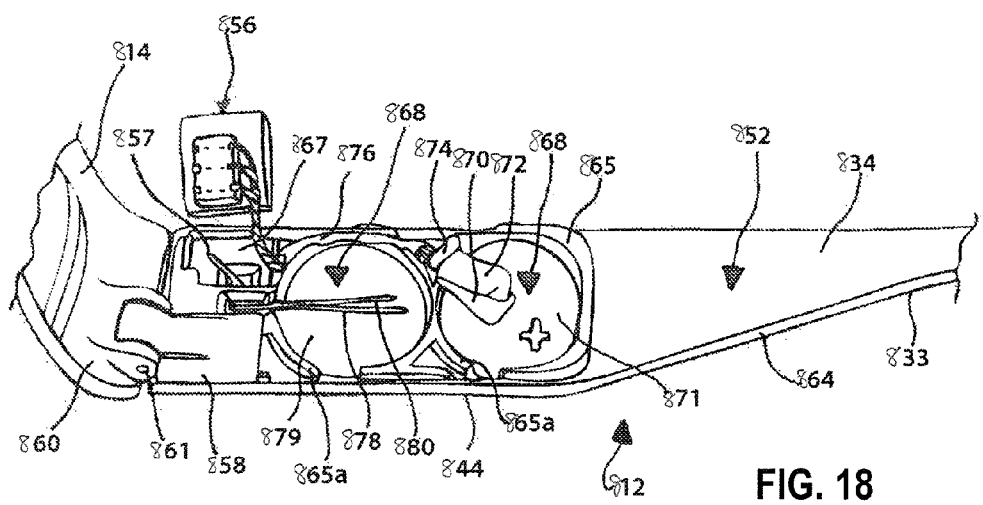
FIG. 18 is an enlarged, exploded view of a portion of the temple arm member of FIG. 6 showing a battery compartment recessed in an inner surface of the temple arm member.
Figure 19:
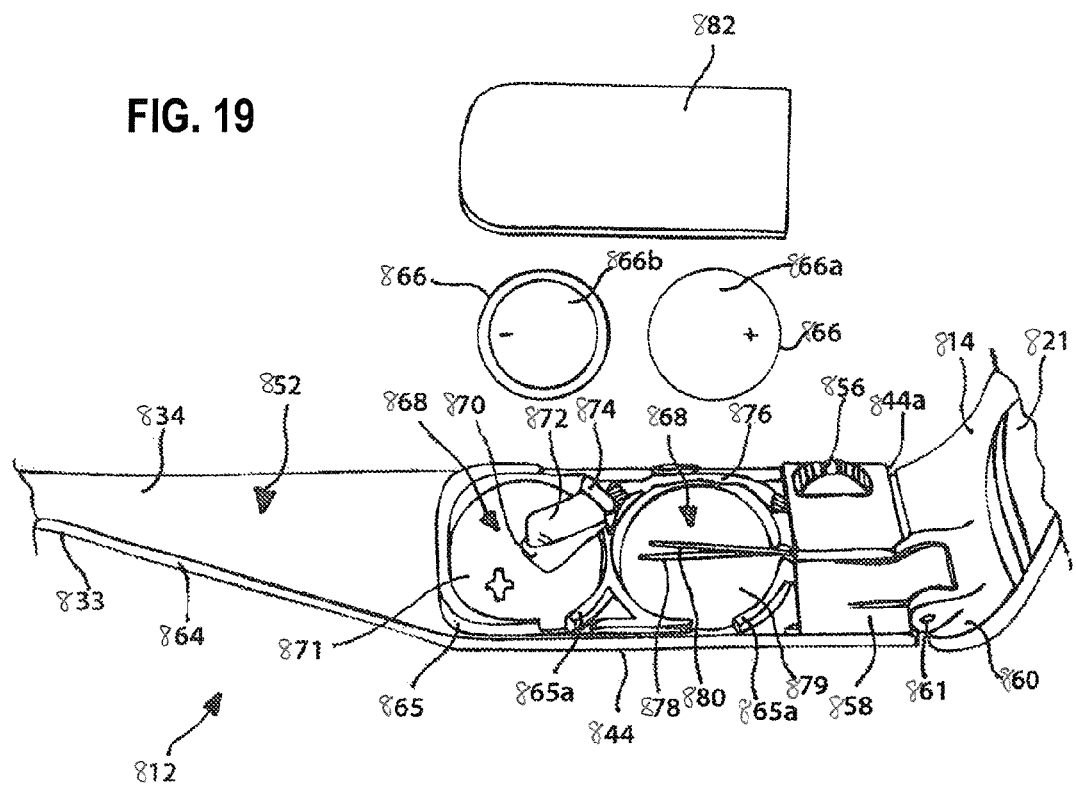
FIG. 19 is an enlarged view of the other temple arm member showing a switch compartment adjacent the battery compartment.

Referring now to FIGS. 17-19, an electrical system 850 is operable to provide power to the LEDs 818. In order to preserve the outwardly visible aesthetics of the illuminated eyewear 810, as described above, the components of the electrical system 850 are either positioned on or accessible through an inner surface portion 852 of each temple arm member 812. Positioning the electrical system components at the inner surface portion 852 effectively hides them from view while the illuminated eyewear 810 is worn. The inner surface portions 852 can have a substantially flat configuration and are arranged so as to face each other when the temple arm members 812 are shifted to the open configuration. In the illustrated form, the inner surface portion 852 includes offset portions 851 and 853 with portion 853 being slightly raised relative to adjacent portion 851. The slightly raised portion 853 is preferably adjacent the cross-frame member 814 so as to correspond to the previously described laterally thicker, forward end portions 844 of the temple arm members 812, but can also be positioned in the intermediate portion 834 or the distal portion 836 of the temple arm member 812. Preferably, the majority of the components of the electrical system 850 are disposed between the inner surface portion 852 and the outer surface portion 840 of the enlarged end portion 844 of the temple 812. So configured, no components of the electronic assembly 850 are visible on the outer surface portion 840 of the temple arm members 812, no components of the electronic assembly 850 are in the cross-frame member 814, and no components of the electronic assembly 850 span the hinge 830.

Figure 21:
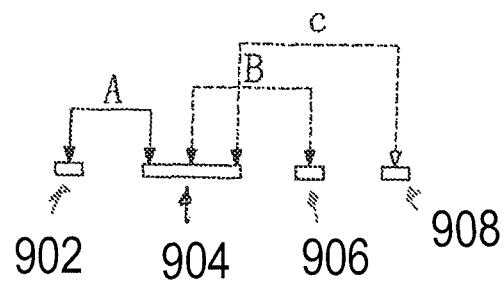
FIG. 21 is a schematic view showing the three different pin connections for the 3-position switch device of FIG. 20.

In the preferred and illustrated form, a compartment 854 is recessed in the inner surface portion 853 for housing components of the electrical system 850. The electrical system components can include a switch or switch device 856, a power source 866, and the electrical connections thereof. As illustrated, the switch device 856 is a slide switch for turning the LEDs on and off, however, other types of switches can be utilized, such as a toggle, a pushbutton, or a touch switch. A rotary switch could also be utilized which could be used to control the power level supplied to the LEDs to provide a dimmer switch function. As shown in FIG. 21, the switch device 856 is connected to one of the LED contacts or leads 857 and also to the power source 866.

Preferably, the switch device 856 is mounted to the temple inner surface portion 852 adjacent to the hinge 830. In particular, the hinge 830 pivotably connects a front temple hinge part 858 to an outer or edge cross-frame member hinge part 860 with a pivot pin 861. In order to preserve space and minimize the length of the space taken up by the electrical system 850 along the temple arm members 812, the switch 856, and particularly the slide actuator 856*a* thereof is preferably disposed in vertical, overlying relation with the temple hinge part 858 of the hinge 830. As can be seen in FIGS. 17-19, the switch actuator 856*a* is positioned above the hinge 830 adjacent the end surface 844 of the temple arm member 812 and adjacent an upper surface 862 of the temple arm member 812. Accordingly, the temple part 858 of the hinge 830 is adjacent a lower surface 864 of the temple arm member 812. So configured, the switch actuator 856*a* is positioned to be manipulated by an index finger of the wearer to control power to the light sources 818. Alternatively, the switch 856 can be positioned adjacent the lower surface 864 of the temple arm member 812 and the temple part 858 of the hinge 830 can be positioned above the switch actuator 856*a* and adjacent the upper surface 862 of the temple arm member 812.

The power source compartment 854 is configured to have a narrow width to keep the lateral thickness of the temple arm members 812, and specifically the forward end portions 844 to a minimum, as previously discussed. The compartment 854 is formed between the inner surface portion 852 and the outer surface portion 840. This narrow width compartment 854 enables the temple arm members 812 to maintain a relatively thin shape, which can provide a more comfortable fit on a wearer's head than thicker temple arm members. The power source compartment 854 is further positioned adjacent to the temple part 858 of the hinge 830 and can be partially recessed into the temple arm member 812. In the illustrated form, the compartment 854 includes upstanding wall portions 865, which project away from the offset inner surface portion 851 to space the raised inner surface portion 853 therefrom. The wall portions 865 are sized and configured to provide the compartment 854 with a depth sufficient to house a substantially flat battery, such as a disc-shaped coin cell battery 866. Preferably, there are at least a pair of batteries to power the LEDs 818, such as a pair of disc-shaped coin cell batteries 866, in a longitudinal and non-overlapping, side-by-side relation, so that main flat surfaces 866*a*, 866*b* of the batteries 866 face the flat inner surface portion 852 and the flat outer surface portion 840 of the temple arm members 812. The wall portions 865 include curved wall portions 865*a* for forming subcompartments 868 that provide the coin cell batteries 866 with a snug fit therein. The compartment 854 can further be divided to include subcompartment 867 sized to partially receive the switch device 856, such as lower electrical components of switch device 856 that electrically couple to the batteries 866 and the LED 818. The switch subcompartment 867 has a generally small, square configuration and is adjacent one side of the upper portion of the forwardmost battery subcompartment 868. So configured, the power source compartment 854 substantially hides the batteries 866 and the switch device 856 from view when the illuminated eyewear 810 is worn.

When the batteries 866 are in the longitudinal side-by-side relation shown in FIGS. 18 and 19, the compartment 854 is divided into two subcompartments or bays 868, each formed by the rim or curved wall portions 865 and configured to support and laterally enclose a single one of the coin cell batteries 866. The far or rearwardmost bay 868 includes a recess or well 870 in a substantially flat bottom surface 871 thereof configured to snugly fit a contact 872, such as a tab-shaped blade connector, coupled to the switch device 856. Accordingly, the well 870 preferably is of a generally rectangular configuration. In addition, the contact 872 includes a bent vertical contact wall portion 874 which fits into a gap in one of the curved wall portions 865, as shown in FIG. 19. The contact 872 is electrically connected to the switch device 856, which as described above, is attached to the contact 857 of the LED 818. Specifically, a wire 876 extends from the contact 872 to the switch device 856 by being secured within a space provided between portions of the rim 865 above or below the other bay 868, preferably depending on the positioning of the switch device 856. The wire 876 can be at least partially covered by an insulating material or jacket along at least a portion of its length. As illustrated, the contact 872 is configured to contact the cathode of the battery 866. The other bay 868 may be positioned adjacent to the switch device 856 and include a recess 878 in a substantially flat bottom surface 879 thereof configured to support a second contact 880 of the light source 818. As illustrated, the contact 880 is one of the elongate leads stemming from the light source 818 and is received in an elongate narrow or thin recess or well 878 to be configured to contact the anode of the other battery 866. The wells 870 and 878 allow the corresponding contacts 872 and 880 to be received in the battery subcompartments while the facing surface of the batteries 866 is in contact therewith and can rest or be supported by the substantially flat bottom surfaces 871 and 879 of the subcompartments 868. So configured, the cathode of one battery 866 is coupled to the switch 856, which is coupled to the LED 818, and the anode of the other battery 866 is coupled directly to the LED 818. This configuration allows the switch device 856 to control power to the LED 818 to turn it on and off. While one specific configuration of the contacts 872, 880 and batteries 866 are illustrated, the components may also be reversed if so desired.

Figure 20:
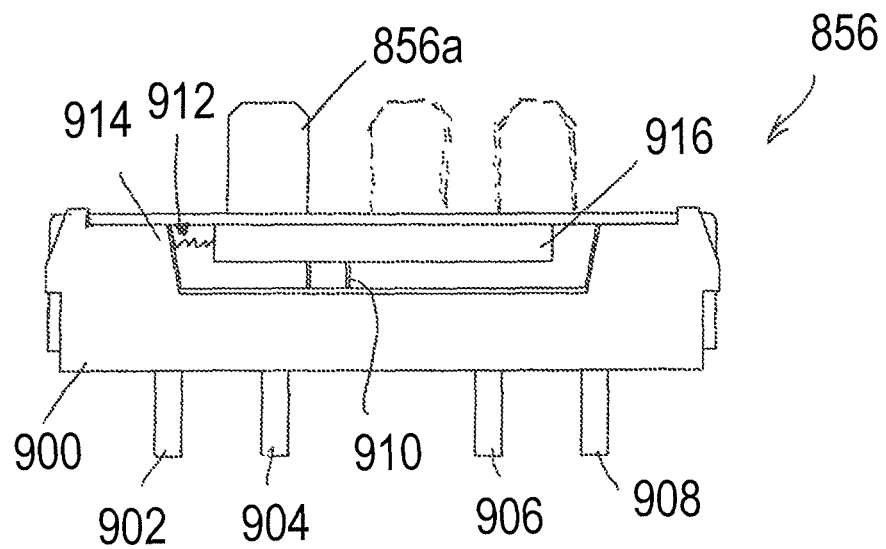
FIG. 20 is an elevational view of a 3-position switch device showing four contact pins depending therefrom.

Further, the switch device 856, rather than having two positions corresponding to "on" and "off" positions as described above, can include three positions of the slide actuator 856a with one position being an "off" position, another position being a "low, on" position and the last position being a "high, on" position so that the switch device 856 can control the lighting power generated by the LED 818 to provide either lower intensity lighting or higher intensity lighting based on the corresponding "on" position of the actuator 856a. Referencing FIGS. 20 and 21, the switch device 856 has the actuator 856a slidably mounted to switch housing 900 which has four pins 902, 904, 906, and 908 depending therefrom. The outer pins 902 and 908 are electrically connected to the LED 818 via contact 857 with pin 908 including a resistor in the electrical path between it and the LED 818 to reduce power to the LED 818 over that supplied via pin 902. Pin 904 is electrically connected to the power source 866 and specifically the cathode of battery power source 866 received in the far bay 868 via tab contact 872 and wire 876. The pin 906 is not electrically connected to either the LED 818 or the power source 866. In each actuator position, two of the pins 902-908 are electrically connected by a conductive bar 910 shifted by the switch actuator 856a. Thus, the high brightness or light intensity position of the switch actuator 856a is the left endmost position in FIG. 20 and is depicted as position "A" in FIG. 21 with LED pin 902 and power pin 904 electrically connected via switch bar 910. The off position is the intermediate or middle position of the switch actuator 856a in the left-to-right direction shown in phantom in FIG. 20 and is depicted as position "B" in FIG. 21 with power pin 904 connected to electrically inactive pin 906. The low brightness or light intensity position of the switch actuator 856a is the right endmost position of the switch actuator 856a shown in phantom in FIG. 20 and is depicted as position "C" in FIG. 21 with power pin 904 and LED pin 908 electrically connected via switch bar 910.

Alternatively, the three positions of the switch actuator 856a can be an end "on" position, an intermediate "off" position, and an opposite end "temporary on" position. In this form, the pins 902-908 would be electrically connected to the LED 818 or power source 866 or inactive as in the above-described 3-position switch device 856, although no resistor is needed in the electrical path between LED pin 908 and LED 818. The switch device 856 in this form allows the user to slide the actuator 856a to the left endmost position corresponding to the "temporary on" position with the corresponding LED 818 only providing light for as long as the switch actuator 856a is maintained in the "temporary on" position. In this regard, the switch actuator 856a can include a biasing mechanism such as in the form of compression spring 912 mounted between switch housing wall 914 and switch actuator base 916 with the spring 912 operable to urge the actuator 856a back to the intermediate "off" position when it is slid toward the "temporary on" position. Thus, for example, the "temporary on" position allows a potential purchaser of the lighted glasses 810 to try the lights via sliding and holding the switch actuator 856a to the "temporary on" position only for as long as needed for their purchasing decision. Once they are satisfied with their testing of the lighting function, they can release the switch actuator 856a which will then automatically return to the "off" position due to the bias force provided thereto by the spring 912. This avoids the need for using the "on" position for this purpose which requires the user to slide the switch actuator 856a back to the "off" position and which if not done undesirably reduces or can eventually use up the power in the battery power source 866. Of course, the "temporary on" position also provides the owner of the glasses 810 a similar advantage. Manifestly, no such spring would be provided for the earlier described 3-position switch device 856 without a "temporary on" position. In addition, it should be understood that the specific arrangement of pins and switch positions for the 3-position switch devices 856 can be varied from that described herein.

By one approach, the raised portion 853 of the inner surface portion 852 includes a removable cover 882, as shown in FIGS. 17 and 18, configured to securely fit over the compartment 854 to secure the batteries 866 within. The cover 882 may optionally include biased members or springs on an inner surface thereof to apply outward pressure on the batteries 866, so the batteries 866 are held against the contacts 872, 880. The cover 882 is removably secured to the compartment 854 by a tongue and groove mechanism securing depending sides and the distal end of the cover 882 using edges or slots provided in the rim 865. Other suitable securing mechanisms can also be utilized. In the illustrated form, the cover 882 is formed from metal (as opposed to the preferred plastic of the eyeglasses and temple portions thereof) in order to limit the thickness of the temple arm member 812. If the cover 882 were fabricated of a plastic similar to the temple arm 812, the cover 882 would have an increased thickness, which would detract from the thin configuration of the temple arm members 812.

As illustrated and described, the temple arm members 812 include all the components necessary to illuminate an area forwardly of the wearer, including the LEDs 818 and the electrical system 850 therefor. Accordingly, this configuration allows the cross-frame member 814 to be easily interchangeable because no electrical components span the pivot connections and/or the hinge 830 between the temple arm members 812 and the cross-frame member 814. Similarly, no electrical components are included in the cross-frame member 814, avoiding the performance problems associated with prior hinge switches. In addition to this, the electrical system 850 has its components disposed positioned entirely on or recesses in the inner surface portion 852 of each temple arm member 812, and the electrical components do not project above the upper surface 862 or below the lower surface 864 of the temple arm member 812. This configuration not only substantially hides the components of the electrical system 850 from view when the illuminated eyewear 810 is worn, but it also protects the electrical components from damage when the lighted eyeglasses 810 are in the folded, storage configuration.

Referring now to FIGS. 22-34, another hands-free lighting embodiment is illustrated, which includes lighted eyeglass frames 500. In general, the lighted eyeglass frame 500 described herein includes a light source mounted onto a portion of the frame for directing light forwardly of the wearer together with a variety of different options to energize the light source.

In one embodiment, as shown in FIGS. 22-25, a light module 518 with a light source or LED 524 is mounted to a collapsible eyeglass frame assembly 500 to form the lighted eyeglasses. The eyeglass frame assembly 500 is configured as a typical eyeglass frame assembly having a pair of spaced temples or arms 502, and a cross-frame member 504 extending therebetween and pivotally connected to each of the temples at either end thereof. The cross-frame member 504 includes an appropriate bridge structure intermediate the ends so that the frame 500 may rest on the bridge of an individual's nose (FIG. 24). The temples 502 extend rearwardly from the spaced ends of the cross-frame member 504 and may also include a downwardly projecting ear portion 506 so that the end 505 of each temple 502 may conform to or extend around an individual's ear (FIG. 22A). Alternatively, the temples may extend generally straight back from the cross-frame member 504 without the ear portion 506 (FIG. 23A). The frame assembly 500 shown in FIGS. 24-27 includes both a retracted position and an extended position.

In the retracted position or state the cross-frame member 504 and temples 502 are preferably collapsed such that the frame 500 is in a more compact form for ease of storage and protection (FIGS. 22B, 23B, 25A, and 25B). As further discussed below, the cross-frame member 504 and each temple 502 separately retract to form the compact structure. In the retracted state, the cross-frame member 504 and temples 502 are generally protected by the light module 518 because, as further described below, the cross-frame member 504 and temples 502 are partially or substantially covered by the light module 518. In other words, the arms 502 will generally not project very far if at all beyond the light modules, and only a small section of the cross-member 504 will be exposed to extend between the modules 518, as can be seen in FIGS. 27A and 2713. Furthermore, in the retracted position, the lighted frame assembly 500 is sufficiently compact to be used as a mini-flashlight. In the retracted position, the modules 524 generally form a double-module LED flashlight, as shown in FIG. 25B.

The illustrated lighted eyeglasses 500 include the light modules 518 mounted to each of the temples 502. The LEDs 524 are configured to provide illumination forwardly of the eyeglasses 500 within the field of view of a wearer. To this end, the light module 518 or the LEDs 524 may be canted inwardly and/or downwardly, such as about 5 degrees, to provide a light beam that is more focused into a wearer's field-of-view. Canting the LEDs in their respective housings can be done as described in Applicant's U.S. Pat. No. 6,612, 696, which is incorporated as if reproduced in its entirety herein. Further, the light beam is provided more directly in the wearer's field of view by being angled inwardly and downwardly relative to the frame temples 502. If the light modules 518 or LEDs 524 are canted in such a manner, it should not be necessary to manually pivot or cant the light to direct the illumination.

More specifically, the light module 518 has the LED 524 protruding therefrom for emanating light therefrom. The modules 518 are mounted to each of the temples 502. The module 518 preferably houses the components needed to illuminate the LEDs 524. For instance, the module 518 has a switch that includes an actuator portion 517 that projects through an elongated slot 519. The actuator portion 517 is designed such that a user's thumb or finger can quickly and easily engage the actuator portion 517 to push or pull the switch for sliding in either one of two directions to turn the light module 518 on and off. The elongated slot 119 is sized such that the switch actuator can be moved only a preset distance, thereby enabling the on and off functions to be accomplished with a minimum of motion. When the switch is moved to the "on" position, batteries that are internally housed in the light module 518 energize the LED 524. Similarly, when the switch is moved to the "off" position, the connection between the batteries and the LED 524 is broken and the LED 524 is turned off. In an exemplary form, the module 518 may be similar to the light modules illustrated and described in the previously incorporated '696 patent. As illustrated, the modules 518 may be integrally formed with the temples 502, but the modules 518 may also be separately mounted to the temples 502 with fasteners or the like as in the '696 patent.

Figure 22A:
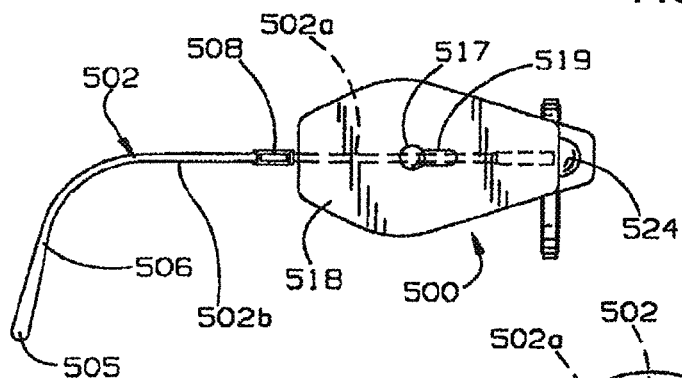
FIG. 22A is a side elevational view of illuminated eyewear in accordance with the present invention showing one of the temple arms in an extended position and a light module attached to the arm.
Figure 22B:
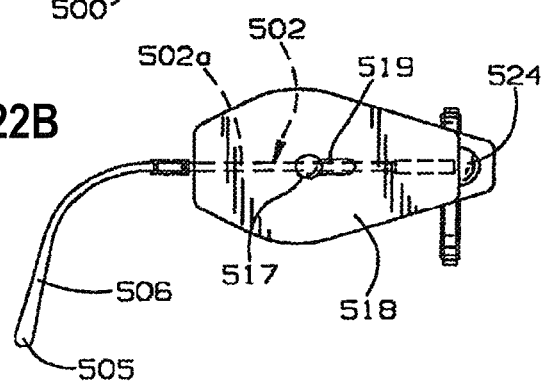
FIG. 22B is a side elevational view of the illuminated eyewear of FIG. 22A showing the arm in a retracted position.
Figure 23A:
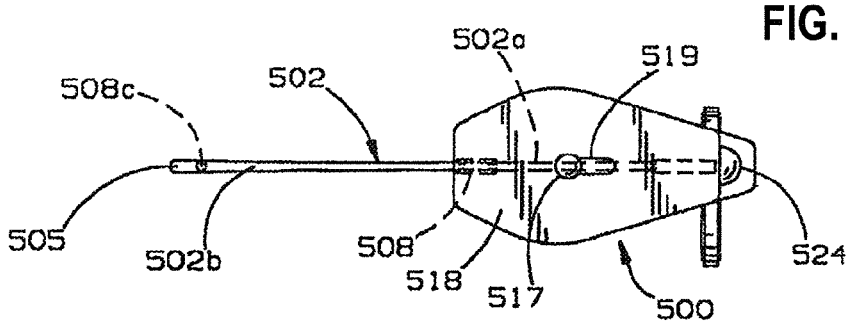
FIG. 23A is a side elevational view of alternative, illuminated eyewear in accordance with the present invention showing one of the temple arms in an extended position and a light module attached to the arm.

As mentioned above, the eyeglass frame 500 includes both retracted and extended states. In this regard, each of the temples 502 may include interconnected segments or members 502a and 502b that can slide relative to each other so that the temple 502 may be shifted between a retracted position (FIGS. 22B and 23B) and an extended position (FIGS. 22A and 23A). Similarly, the cross-frame member 504 also preferably includes interconnected segments or members 504a, 504b, 504c, and 504d that retract and extend in a similar manner (FIGS. 24 and 25). The segments of the temples and cross frame member can also telescope to extend and retract with one of the segments having a tubular or c-shaped structure so that the connected segments can slide in and out therefrom. While the cross-frame member 504 and temple 502 are illustrated with specific number of segments, more or less segments may also be used depending on the size and strength of the frames desired.

Figure 23B:
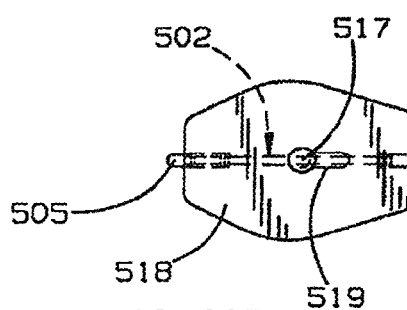
FIG. 23B is a side elevational view of the illuminated eyewear of FIG. 23A showing the arm in a retracted position.

More specifically, in the retracted condition of the temples 502, the temple segment 502b retracts or slides relative to temple segment 502a either into a temple receiving compartment in the module 518 or alongside the module 518 at an outer surface thereof so that at least a portion of each of the temple segments are superimposed over each other and overlap the module 518. As illustrated in FIG. 22B, in the retracted condition, the ear portion 506 extends beyond the module 518. However, the projecting ear portion 506 is much smaller than the fully extended temple arm 502. The extent to which the temple arm 502 projects beyond the module when the arm is retracted may vary depending on the size and angle of ear portion 506 as it is not uncommon for the configuration of the ear portion 506 to vary based on the comfort needs of the individual wearer. Alternatively, if the temples 502 do not have a specially contoured ear portion 506, but a straight temple portion, then substantially the entire temple 502 may overlap the module 518 when retracted. For example, as illustrated in FIG. 23B, if the temple portion 502 is generally straight, then the temple segments 502a and 502b may retract into a position such that each segment 502a and 502b substantially overlaps each other and the module 518 but for a small projecting end section 505 of the temple. In this configuration, substantially the entire temple 502 is protected from damage in the retracted state by the module 518 because the temple 502 is retracted into or alongside the module 518. The larger width size of the module 518 transverse to the length of the temple arm 502 protects the elongate, thin temple portion 502.

Figure 23C:
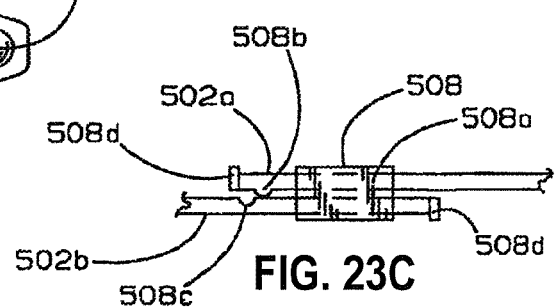
FIG. 23C is an enlarged, fragmentary view of the temple arms of FIGS. 22A, 22B, 23A, and 23B showing a releasable locking structure between forward and rearward segments of the arm.

In the extended state of the temples 502, each of the segments 502a and 502b are extended outwardly from the module 518 so as to form traditional temples of common eyeglasses (FIGS. 22A, 23A, and 24). As illustrated in FIG. 23C, the temple segments 502a and 502b may include a releasable locking structure 508 therebetween such that the extended temple segments may be held in their extended and retracted positions. That is, the locking structure 508 may include, for example, a retaining sleeve member 508a through which the temple segments 502a and 502b extend, a boss or other protrusion 508b on an end of one of the temple segments and a corresponding detent or groove 508c on an adjacent end of the other temple segment that engage and register so that the protrusion 508b seats in the groove 508c upon the segments reaching a predetermined, extended position relative to each other to releasably hold the temple segments in the extended state. The locking structure 508 may also include stop members 508d on ends of each segment that interfere with the retaining member 508a to avoid having the temple arms separate from each other. In addition, the end 505 of the temple arm 502b may also include a detent 508c to engage the protrusion 508b when the temple arm 502b is retracted. Manifestly, the locations of the protrusions 508b and detent grooves 508c can be reversed, or a pair of protrusions 508b can be provided on one of the arm segments with a single groove 508c formed in the other arm segment.

Referring now to FIGS. 24, 25A, and 25B, as mentioned above, the cross-frame member 504 may also include a retracted and extended position. As illustrated in FIG. 26, the frame 500 is shown in the extended position resembling a traditional eyeglass frame. FIGS. 25A and 25B illustrate the cross-frame member 504 and temple arms 502 of the frame 500 in the retracted position with FIG. 25A showing the retracted temple arms 502 having arcuate ear portions 506 (FIG. 22B) and FIG. 25B showing the retracted, straight temple arms 502 (FIG. 23B).

To achieve the retracted position of the cross-frame member 504, a user slides the outer segments 504a and 504d of the cross-frame member 504 inwardly toward each other such that the temples 502 and the attached or integrated modules 518 are moved laterally toward each other. It can be appreciated that the cross-member frame 504 can be retracted with the temples 502 either in the retracted or in the extended positions. In order to retract and extend, the cross-frame member 504 also includes connected segments or members 504a, 504b, 504c, and 504d. A user slides the segments inwardly such that segment 504a and 504b overlap to retract one side of the frame 500 and the segments 504c and 504d overlap to retract the other side of the frame 500.

The cross-frame member 504 is extended in a reverse manner by sliding or extending the segments 504a and 504d outwardly. As with the temples 502, the cross-frame member 504 preferably includes a similar locking structure 508 so that the cross-frame member 504 can be releasably held in either the retracted or extended positions.

When both the cross-frame member 504 and each temple 502 are retracted, the frame 500 is significantly more compact than the traditional eyeglass frame as best shown in FIGS. 25A and 25B. Preferably, the fully retracted frame 500 is about as wide as the depth of two modules 518 and about as long as each module 518. As previously stated, a small section 505 of the ear portion 506 may extend beyond the modules 518 in the retracted state so that, if the temple arm is retracted into the light housing 518, the projecting section 505 allows the user to pull the temple arm out of the housing back to its extended position. In this compact state, the frame 500 is easily placed in a pocket, bag, or purse until hands-free lighting is needed. The frame 500 may be expanded to be used as hands free lighting as previously described or used in the compact condition as a compact hand-held flashlight. Moreover, in this compact state, the frame 500 is protected from damage as the frame does not have elongate members that are easily bent or broken. As previously described, when the frame 500 is in the retracted state, the cross-frame member 504 and temple arms 502 are slid either into or alongside the light module 518. Therefore, in this state, the larger module 518 protects the more narrow frame portions 502 and 504 from being damaged when in a pocket or purse, for instance.

The eyeglass frame 500 may also include lenses similar to traditional glasses. For example, the frame 500 may include reading lenses, prescription lenses, protective or safety lenses, magnifying lenses, clear or non-refractive lenses, or the like. If included, the lenses would generally depend from the cross-member frame 504 or the cross-frame member 504 could also include portions that encircle the lenses. The lenses may have a pivot connection to the frame where the cross-frame member 504 and the temple arms 502 are pivotally connected. In this manner, the edge of the lenses opposite the pivot connection (i.e., near the bridge) may pivot inwardly from the cross-frame member 504 to the temple arms 502 to facilitate the retraction of the cross-frame member 504. On the other hand, a top edge of the lenses may be pivotally mounted to the cross-frame member 504 so that when the frame is in a retracted condition, the lenses may be pivoted up to the retracted frame structure. In such configurations, the frame 500, even with optional lenses, may be retracted into a compact form. Alternatively, the eyeglass frame 500 may be devoid of such lenses so that the frame 500 is configured simply to provide a form of headgear that provides for hands-free lighting.

Referring to FIGS. 26-34, various alternative temple portions 602 are illustrated for the frame assembly 500. Herein, these alternative temple portions generally do not retract, but have different configurations and can include rechargeable batteries 600 and recharging contacts 603. As shown, the recharging contacts 603 include a positive contact 603a and a negative contact 603b, which may be in separate temple portions 602 (FIG. 34) or both in the same temple portion 602 (FIG. 33). The charging contacts 603 are for being electrically connected to corresponding contacts 654 of a separate battery charger.

The temple portions 602 include a light source 604, preferably an LED, housed within an opening or hollowed portion of the temple frame 610 and which protrude axially outward from the forward end 602a of the temple frame such that a light beam would be directed forwardly of the wearer, as previously described. The lights 604 may also be angled or canted inwardly or downwardly to provide a light beam more directly in the wearer's field of view. For example, the LED may tilt down about 5 degrees. The alternative temples 602 illustrated in FIGS. 26-34 generally can provide a more compact illumination device when worn than previously described with the light module 518 because the components to energize the light 604 are contained or integrated into the temple portions 602 rather than being within a separate module 518.

More specifically, FIGS. 26 and 27 illustrate two batteries 600 spaced longitudinally in the fore and aft direction that are housed internally in a forward portion 602b of the temple 602 adjacent pivot member 606. In this manner, the forward portion 602b of the temple portion 602 including the forward end 602a thereof is the light mount for the batteries 600 and the light source or LED 604. To contain the batteries, the forward portion 602b of the temple arm is enlarged in a direction transverse to its length and to the cross-frame member 504 with the lighted frames in their unfolded configuration for use. The forward portion 602b has a tapered configuration along its length. Also, the forward portion 602b is thicker than the narrower remainder or rear portion 602d of the temple arm with a shoulder 602c provided therebetween. The batteries 600 are in electrical communication with the recharging contact 603 at a distal end 605 of an ear portion 608 of the temple arm 602. As will be further described below, the recharging contacts 603 cooperate with contacts 654 of a separate battery charging module or unit 650. FIGS. 28 and 29 illustrate a similar battery arrangement, but show a temple 602 having a modified contour to house the longitudinally spaced batteries 600. Rather than a smooth taper, the forward portion of the arm has a rectangular configuration for receiving the batteries 600 therein.

FIGS. 30 and 31 illustrate an overlapping battery configuration where the batteries 600 are stacked in a side-by-side arrangement. In this arrangement, the temple frame or housing 610 need not be as long in the longitudinal direction as with the previous temple arms, but is wider or thicker in the lateral direction transverse to the fore and aft longitudinal direction to accommodate the stacked batteries 600.

FIGS. 32 and 33 illustrate another modified temple 602 that houses the batteries 600 within the rear ear portion 606, preferably in a longitudinally spaced arrangement to keep the width or thickness of the ear portion to a minimum. In this embodiment, the batteries 600 are closely positioned to the recharging contacts 603 to keep the length of the electrical connections therebetween to a minimum. Herein, the positive charging contact 603a and negative charging contact 603b are both disposed at the distal end 605 of the same temple portion 602. Such combined configuration allows a more compact battery charger because only one temple 602 is required to connect to the battery charger.

Referring to FIG. 34, the eyeglass frame 500 is illustrated with the modified temple portions 602 being connected to a stand-alone battery charger 650 with the positive contact 603a and negative contact 603b shown in separate temple arms 602. To charge the batteries 600 in the battery charger 650, the temple arms 602 are preferably pivoted inwardly toward the cross-frame member to fold the frame 500 into a retracted condition, the distal ends 605 of each temple arm 602 are then connected to a receiving base member 652, which may be included on a stand alone charger. Alternatively, the receiving base member 652 may be integrated within an eyeglass frame case. The battery charger 650 is plugged into a 110 volt wall outlet. The base member 652 has recharging contacts 654 that correspond with the recharging contacts 603 on the eyeglass frame temples 602, but have an opposite polarity. Therefore, when inserted in the battery charger 650, the batteries 600 are in electrical communication with a power source such that the batteries 600 may charged. Alternatively, the battery charger 650 may be configured to accept the eyeglass frame 500 with the temple arms 602 in an unfolded position, or may have a more compact configuration as previously mentioned, such as when only one temple arm 602 has both charging contacts 603a and 603b thereon.

While there have been illustrated and described particular embodiments of the present invention, it will be appreciated that numerous changes and modifications will occur to those skilled in the art, and it is intended in the appended claims to cover all those changes and modifications that fall within the true sprit and scope of the present invention.

What is claimed is:
1. Illuminated eyewear comprising:
a cross frame portion extending along a lateral axis and having opposite end portions;
temple arm portions extending rearwardly from adjacent to the end portions of the cross frame portion in a use position, each temple arm portion having a forward portion, an intermediate portion configured to rest on an ear of a wearer, and a rear portion;
light mounts at the forward portions of the temple arm portions having a forward opening and an interior space;
light emitting diodes received in the interior spaces of the temple arm light mounts and mounted to project light through the forward openings thereof to a position forwardly of the cross frame portion;
a mounting surface of each of the temple arm light mounts configured to orient the light emitting diodes at a predetermined inwardly canted angle relative to normal from the lateral axis of the cross frame portion with the temple arm portions in the use configuration.

2. The illuminated eyewear of claim 1 wherein the light emitting diodes each include a generally cylindrical portion and the mounting surface is concave for cooperatively receiving the generally cylindrical portion of the light emitting diode thereagainst.

3. The illuminated eyewear of claim 1 wherein the light emitting diodes each include a dome lens, and the mounting surface of each light mount comprises a pair of concave mounting surfaces that are configured to capture the dome lens therebetween to orient the light emitting diode at the inwardly canted angle relative to normal from the lateral axis of the cross frame portion with the temple arm portion in the use configuration.

4. The illuminated eyewear of claim 1 further comprising switches extending in the interior spaces of the light mounts for selectively energizing the light emitting diodes.

5. The illuminated eyewear of claim 4 wherein the switches are slide switches having actuator portions, and the light mounts include slot openings through which the actuator portions extend out from the interior spaces for sliding therein.

6. The illuminated eyewear of claim 1 wherein the light emitting diodes each include a pair of rearwardly extending leads configured to electrically couple to the switch and at least one battery, respectively.

7. The illuminated eyewear of claim 6 wherein the light mounts include a channel in the interior space thereof configured to receive the lead of the light emitting diode electrically coupled to the at least one battery.

8. The illuminated eyewear of claim 1 wherein the light mount of each temple arm portion has a lateral width of less than 0.5 inch.

9. The illuminated eyewear of claim 1 wherein the interior space of each of the light mounts is sized to receive a battery for providing electrical energy to the light emitting diodes.

10. The illuminated eyewear of claim 1 wherein the forward portions of the temple arm portions and the end portions of the cross-frame portion have pivot connections therebetween so that the temple arm portions have a stored position with the temple arm portions pivoted to extend generally along the cross-frame portion.

11. The illuminated eyewear of claim 1 wherein the mounting surfaces are configured to fix the light emitting diodes at a predetermined inward cant angle with respect to the cross-frame portion to create an overlapping zone of light in a predetermined reading range.

12. The illuminated eyewear of claim 11 wherein the predetermined inward cant angle is the same for both of the light emitting diodes so that the overlapping zone is centrally disposed forwardly of the cross-frame portion.

13. The illuminated eyewear of claim 1 wherein the cross-frame portion has a pair of lenses of a light transmissive material mounted thereto with the lenses having a predetermined configuration for refracting light to provide vision correction.

14. The illuminated eyewear of claim 13 wherein the pair of lenses each have a laterally inner portion and a laterally outer portion, and the light emitting diodes are mounted to the temple arm portions adjacent to the outer portions of the lenses.

15. The illuminated eyewear of claim 1 wherein the light mounts each include a battery in the interior space thereof, and a removable cover to provide selective access to the battery in the light mount interior space.

16. The illuminated eyewear of claim 1 wherein the mounting surfaces of the light mounts are further configured to orient the light emitting diodes at a downwardly canted angle relative to the cross frame portion.

17. The illuminated eyewear of claim 1 wherein the light mounts comprise self-contained light modules mounted to the temple arm portions.

18. Lighted glasses comprising:
a pair of lenses having outer portions and inner portions with the inner portions being adjacent to and laterally spaced from each other;
a pair of lights associated with the lenses each projecting a light beam forwardly of the lenses;
a pair of temple arm assemblies that extend rearwardly from adjacent the outer portions of the lenses when the lighted reading glasses are configured to be worn with the temple arm assemblies having the lights fixedly mounted relative thereto at an inwardly canted angle so that the light beams thereof overlap to provide an overlapping lighted area closer to the lenses than provided by uncanted lights; and
support surfaces of the temple arm assemblies for the lights having a predetermined configuration that are fixed relative to the temple arm assemblies to orient the lights at the inwardly canted angle to be fixed against movement in any direction relative to the temple arm assemblies to avoid the need to adjust the lights to create the overlapping lighted area.

19. The lighted glasses of claim 18 wherein the lights include side surfaces and the support surfaces have a generally complementary configuration to the side surfaces.

20. The lighted glasses of claim 18 wherein the support surfaces comprise a pair of support surfaces associated with each light with each pair of support surfaces configured to fixedly capture the associated light therebetween.

21. The lighted glasses of claim 18 further comprising a pair of switches mounted to the temple arm assemblies for controlling operation of the lights.

22. The lighted glasses of claim 21 wherein the switches are slide switches and each include an actuator portion projecting outwardly from the respective temple arm assemblies.

23. The lighted glasses of claim 18 wherein the temple arm assemblies include light housing portions in which the lights and the support surfaces are received.

24. The lighted glasses of claim 23 wherein the light housing portions include removable covers to provide access to the lights therein.

25. The lighted glasses of claim 18 wherein the temple arm assemblies include self-contained light modules that are fixed thereto, with the self-contained light modules including the lights and the support surfaces.

26. The lighted glasses of claim 25 wherein the self-contained light modules are removable from the temple arm assemblies.

27. The lighted glasses of claim 18 wherein the temple arm assemblies each further comprise at least one disc-shaped battery, and at least one battery holder having a generally annular interior surface that is fixed relative to the temple arm assemblies and which is sized to receive the at least one disc-shaped battery therein.

28. The lighted glasses of claim 18 further comprising a cross-frame with the lenses mounted to the cross-frame with the temple arm assemblies pivotably connected thereto.

29. The lighted glasses of claim 28 wherein the temple arm assemblies and the cross-frame have hinges therebetween for pivotably connecting the temple arm assemblies to the cross-frame.

30. The lighted glasses of claim 18 wherein the predetermined configuration of the support surfaces for the lights further orients the lights at a downwardly canted angle.

31. The lighted glasses of claim 18 wherein the lenses have a predetermined configuration for refracting light to provide a user with vision correction.

\* \* \* \* \*